(12) United States Patent
Matsumoto et al.

(10) Patent No.: US 10,677,187 B2
(45) Date of Patent: Jun. 9, 2020

(54) COMBUSTION CONTROL DEVICE FOR COMPRESSION AUTOIGNITION ENGINE

(71) Applicant: Mazda Motor Corporation, Aki-gun, Hiroshima (JP)

(72) Inventors: Kota Matsumoto, Aki-gun (JP); Tomonori Urushihara, Yokohama (JP); Atsushi Inoue, Aki-gun (JP); Yusuke Kawai, Hiroshima (JP); Toru Miyamoto, Higashihiroshima (JP); Yudai Koshiro, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 48 days.

(21) Appl. No.: 16/087,053

(22) PCT Filed: Nov. 25, 2016

(86) PCT No.: PCT/JP2016/084999
§ 371 (c)(1),
(2) Date: Sep. 20, 2018

(87) PCT Pub. No.: WO2018/096653
PCT Pub. Date: May 31, 2018

(65) Prior Publication Data
US 2019/0093592 A1    Mar. 28, 2019

(51) Int. Cl.
*F02D 41/40* (2006.01)
*F02D 41/00* (2006.01)
(Continued)

(52) U.S. Cl.
CPC .............. *F02D 41/401* (2013.01); *F02B 1/08* (2013.01); *F02B 11/00* (2013.01);
(Continued)

(58) Field of Classification Search
None
See application file for complete search history.

(56) References Cited

U.S. PATENT DOCUMENTS 5,315,973 A * 5/1994 Hill ..................... F02B 23/0672
                                                    123/27 GE
5,392,745 A * 2/1995 Beck ...................... F02M 47/02
                                                    123/295
(Continued)

FOREIGN PATENT DOCUMENTS

EP          1083324 A2    3/2001
JP       2005256777 A     9/2005
(Continued)

OTHER PUBLICATIONS

Manofsky, L. et al., "Bridging the Gap between HCCI and SI: Spark-Assisted Compression Ignition" SAE International, Apr. 12, 2011, 18 pages.

*Primary Examiner* — Joseph J Dallo
(74) *Attorney, Agent, or Firm* — Alleman Hall Creasman & Tuttle LLP

(57) ABSTRACT

A combustion control device for a compression autoignition engine includes an engine, a state quantity setting device, a spark plug, a controller, and a sensor. The spark plug receives a control signal from the controller and ignites air-fuel mixture at predetermined ignition timing such that the ignited air-fuel mixture is combusted by flame propagation and then unburned air-fuel mixture in a combustion chamber is combusted by autoignition. The controller outputs a control signal to an injector such that, in a compression stroke, fuel is injected at specific timing at which a line obtained by extending an axis of each hole of the injector overlaps with a specific portion including an opening edge of a cavity in an upper surface of a piston.

8 Claims, 20 Drawing Sheets

(51) Int. Cl.
*F02B 1/08* (2006.01)
*F02B 23/06* (2006.01)
*F02B 23/10* (2006.01)
*F02P 5/15* (2006.01)
*F02B 11/00* (2006.01)
*F02D 41/30* (2006.01)
*F02D 41/38* (2006.01)
*F02D 23/00* (2006.01)
*F02B 1/12* (2006.01)

(52) U.S. Cl.
CPC ...... *F02B 23/0651* (2013.01); *F02B 23/0669* (2013.01); *F02B 23/0687* (2013.01); *F02B 23/101* (2013.01); *F02D 41/0007* (2013.01); *F02D 41/0052* (2013.01); *F02D 41/3041* (2013.01); *F02P 5/15* (2013.01); *F02B 1/12* (2013.01); *F02B 2023/103* (2013.01); *F02D 23/00* (2013.01); *F02D 41/402* (2013.01); *F02D 2041/389* (2013.01); *Y02T 10/144* (2013.01); *Y02T 10/46* (2013.01)

(56) References Cited

U.S. PATENT DOCUMENTS

| | | | | |
|---|---|---|---|---|
| 6,289,868 | B1* | 9/2001 | Jayne | F02M 27/042 123/260 |
| 8,096,108 | B2* | 1/2012 | Najt | F01N 3/2006 60/274 |
| 2008/0140300 | A1* | 6/2008 | Kuo | F02B 17/00 701/113 |
| 2008/0283006 | A1* | 11/2008 | Sutherland | F01L 13/0015 123/90.15 |
| 2011/0010074 | A1* | 1/2011 | Hung | F02D 35/021 701/103 |
| 2011/0108001 | A1* | 5/2011 | Lee | F02B 17/005 123/305 |
| 2011/0197580 | A1* | 8/2011 | Andrasko | F02D 23/00 60/602 |
| 2011/0238280 | A1* | 9/2011 | Shibata | F02D 11/105 701/102 |
| 2012/0247439 | A1* | 10/2012 | Ramappan | F02B 1/12 123/568.11 |
| 2013/0125544 | A1* | 5/2013 | Mond | F02D 23/00 60/611 |
| 2015/0285139 | A1* | 10/2015 | Edwards | F02B 3/08 60/605.2 |
| 2016/0186681 | A1* | 6/2016 | Ravi | F02D 41/3064 701/115 |
| 2017/0204777 | A1* | 7/2017 | Riley | F02D 13/0276 |
| 2018/0223723 | A1* | 8/2018 | Riley | F02B 23/04 |

FOREIGN PATENT DOCUMENTS

| | | |
|---|---|---|
| JP | 4082292 B2 | 4/2008 |
| JP | 2012241588 A | 12/2012 |
| JP | 2012241590 A | 12/2012 |
| JP | 2012246783 A | 12/2012 |
| JP | 5447423 B2 | 3/2014 |
| JP | 2014227904 A | 12/2014 |

* cited by examiner

COMBUSTION CONTROL DEVICE FOR COMPRESSION AUTOIGNITION ENGINE

TECHNICAL FIELD

The present disclosure relates to a combustion control device for compression autoignition engine.

BACKGROUND ART

Patent Document 1 discloses an engine which combusts air-fuel mixture in a combustion chamber by autoignition in a partial load region. This engine promotes autoignition of air-fuel mixture by leaving hot burned gas in the combustion chamber in an operation region on a low load side in the partial load region. Furthermore, in the engine, in an operation region on a high load side in the partial load region, cooled burned gas is introduced into the combustion chamber such that autoignition is less likely to occur, and a spark plug performs ignition immediately before the compression top dead center.

In addition, Patent Document 2 describes an engine in which autoignition of air-fuel mixture is performed twice at different times for the purpose of reducing combustion noise in a partial load region. In the engine, fuel is injected toward a region outside a cavity of a piston in a compression stroke. Accordingly, autoignition of air-fuel mixture formed outside the cavity is performed at or near the compression top dead center. In addition, in the engine, after this autoignition, fuel injection for the second time is performed. Accordingly, air-fuel mixture is formed in the cavity, and the air-fuel mixture in the cavity is combusted by autoignition.

CITATION LIST

Patent Document

PATENT DOCUMENT 1: Japanese Patent No. 4082292
PATENT DOCUMENT 2: Japanese Patent No. 5447423

SUMMARY OF THE INVENTION

Technical Problem

Incidentally, in combustion by autoignition, if the temperature in the combustion chamber before start of compression varies, timing of autoignition greatly changes. For example, if timing of autoignition is advanced, combustion noise is increased. In the case of performing combustion by autoignition, the temperature in the combustion chamber has to be minutely controlled.

In order to accurately control timing of autoignition, a combustion mode in which SI (Spark Ignition) combustion and CI (Compression Ignition) combustion are combined is conceivable. In this combustion mode, a spark plug forcibly ignites air-fuel mixture in a combustion chamber, to combust the air-fuel mixture by flame propagation, and heat generation by the SI combustion increases the temperature in the combustion chamber, to combust unburned air-fuel mixture by autoignition. Variation in the temperature in the combustion chamber before start of compression can be absorbed by adjusting an amount of heat generated by the SI combustion. Timing of autoignition can be controlled by adjusting start timing of the SI combustion according to the temperature in the combustion chamber before start of compression, for example, through adjustment of ignition timing. The CI combustion is controlled by the SI combustion. Therefore, the combustion mode in which the SI combustion and the CI combustion are combined is hereinafter referred to as SICI combustion.

In SICI combustion, in order to accurately control timing of autoignition, timing of autoignition has to change according to ignition timing being changed. Sensitivity for change of timing of autoignition with respect to change of ignition timing is preferably high.

The present disclosure is conceived in view of the above points and accurately controls timing of autoignition in SICI combustion in which SI combustion and CI combustion are combined.

Solution to the Problem

According to the study by the inventors of the present invention, it has been found that, in order to increase sensitivity for change of timing of autoignition with respect to change of ignition timing, the combustion speed in the SI combustion in SICI combustion has to be high. Therefore, the inventors of the present invention have considered increasing the combustion speed in the SI combustion in SICI combustion by using flow of gas (that is, turbulent energy) generated when an injector injects fuel into a combustion chamber.

The turbulent energy generated when fuel is injected is attenuated according to progress of the compression stroke. In order to increase the turbulent energy in the combustion chamber at ignition timing, it is advantageous to inject fuel at timing close to the ignition timing. Therefore, injecting fuel for the CI combustion in the SICI combustion at timing that is not close to ignition timing (that is, preceding injection) and injecting fuel for the SI combustion at timing close to the ignition timing (that is, succeeding injection), is conceivable. Homogeneous air-fuel mixture is formed by the preceding injection, whereby fuel economy is improved and exhaust gas performance also becomes good. In addition, by the succeeding injection, the combustion speed in the SI combustion is increased, and timing of autoignition can be accurately controlled as described above. As a result, an increase in combustion noise can be avoided.

However, when the load on an engine is relatively low, the total amount of fuel to be supplied into the combustion chamber is decreased. The inventors of the present invention have found that, if fuel is injected in the preceding injection and in the succeeding injection when the total amount of fuel is small, the amount of fuel to be injected per one time is excessively small, so that penetration of fuel spray becomes weak. When the penetration of the fuel spray becomes weak, the homogeneity of the above-described air-fuel mixture is decreased, which is disadvantageous for fuel economy and exhaust gas performance. In addition, the turbulent energy is decreased, so that controllability of timing of autoignition is also decreased.

If fuel is injected at once rather than being divided and injected in parts, the amount of fuel to be injected per one time is increased, and thus the penetration of fuel spray becomes strong. However, if the injection timing of the undivided injection is retarded in the compression stroke, turbulent energy at ignition timing is increased, but the homogeneity of air-fuel mixture is decreased. On the other hand, if the injection timing of the undivided injection is advanced in the compression stroke, the homogeneity of air-fuel mixture is improved, but the turbulent energy at ignition timing is decreased. Assuring turbulent energy by fuel injection and homogeneity of air-fuel mixture are conflicting requirements.

As a result of repeated study for injection timing of fuel, the inventors of the present invention have found a state where both assuring turbulent energy by fuel injection and homogeneity of air-fuel mixture are achieved, and thus have completed a technique disclosed here.

Specifically, the technique disclosed here relates to a combustion control device for a compression autoignition engine. The combustion control device for the compression autoignition engine includes: an engine configured to cause autoignition of air-fuel mixture in a combustion chamber formed by a cylinder and a piston; a state quantity setting device mounted to the engine, the state quantity setting device configured to set an inside of the combustion chamber to a desired state by adjusting introduction of fresh air and burned gas into the combustion chamber; an injector mounted to a roof of the combustion chamber, the injector configured to inject fuel into the combustion chamber; a spark plug disposed so as to face the inside of the combustion chamber, the spark plug configured to ignite air-fuel mixture in the combustion chamber; a controller connected to the state quantity setting device, the injector, and the spark plug, the controller configured to operate the engine by outputting control signals to the state quantity setting device, the injector, and the spark plug; and a sensor connected to the controller, the sensor configured to detect a parameter regarding an operation state of the engine and output a detection signal to the controller.

The piston has a cavity that is recessed from an upper surface of the piston and that faces the injector; the injector has a plurality of holes each having a hole axis inclined relative to a cylinder axis of the cylinder and injects the fuel toward the upper surface of the piston; the spark plug receives a control signal from the controller and ignites the air-fuel mixture at predetermined ignition timing such that the ignited air-fuel mixture is combusted by flame propagation and then unburned air-fuel mixture in the combustion chamber is combusted by autoignition; and the controller outputs a control signal to the injector such that, in a compression stroke, the fuel is injected at specific timing at which a line obtained by extending the axis of each hole of the injector overlaps with a specific portion including an opening edge of the cavity in the upper surface of the piston.

The "combustion chamber" described herein is not limited to a space formed when a piston reaches the compression top dead center. The term "combustion chamber" is used to encompass a broader meaning.

In this configuration, the injector has a plurality of holes each having a hole axis inclined relative to the cylinder axis of the cylinder and injects the fuel through each hole toward the upper surface of the piston. The injector receives a control signal from the controller, thereby injecting the fuel into the combustion chamber in the compression stroke. The timing at which the fuel is injected is the specific timing at which a line obtained by extending the axis of each hole of the injector overlaps with the specific portion including the opening edge of the cavity in the upper surface of the piston.

The fuel spray injected at the specific timing collides against the opening edge of the cavity and a portion near the opening edge of the cavity, a part of the spray flows toward the outside of the cavity, and a part of the spray flows toward the inside of the cavity. The fuel spray flowing to the outside of the cavity mixes with fresh air in a region outside the cavity to form homogeneous air-fuel mixture while the piston is moving toward the top dead center. In addition, the fuel spray flowing to the inside of the cavity mixes with fresh air in a region inside the cavity to form homogeneous air-fuel mixture while the piston is moving toward the top dead center. Moreover, since gas flows in the cavity, turbulent energy in the cavity is increased.

The spark plug receives a control signal from the controller and forcibly ignites air-fuel mixture in the combustion chamber. Accordingly, air-fuel mixture in the cavity is combusted by flame propagation. As described above, in the cavity, the turbulent energy is increased, and thus the combustion speed in SI combustion is increased. When the combustion speed in the SI combustion is high, sensitivity for change of timing of autoignition with respect to change of ignition timing becomes high, and thus timing of autoignition is advantageously controlled with high accuracy.

The temperature in the combustion chamber is increased by the SI combustion, whereby unburned air-fuel mixture in the combustion chamber is combusted by autoignition. Accordingly, SICI combustion is completed.

When the fuel is injected at the specific timing, the homogeneity of air-fuel mixture is enhanced in each of the regions inside and outside the cavity as described above. As a result, in the SICI combustion, unburned fuel loss is reduced, so that fuel economy is improved. In addition, generation of smoke is avoided, so that exhaust gas performance becomes good.

The injector may be disposed at a center portion of the combustion chamber such that a central axis of the injector is parallel to the cylinder axis of the cylinder, and injects the fuel from the center portion of the combustion chamber toward a radially outer side, and the cavity may be located on an extension of the central axis of the injector.

In this configuration, when the injector injects the fuel at the specific timing, the fuel spray injected from the center portion of the combustion chamber toward the radially outer side collides against the opening edge and the portion near the opening edge over the entire circumference of the opening edge of the cavity. A part of the spray flows toward the outside of the cavity, and a part of the spray flows toward the inside of the cavity. Both assuring turbulent energy in the cavity and homogeneity of air-fuel mixture in each of the regions inside and outside the cavity can be achieved at a high level.

The spark plug may be disposed on one side with respect to the cylinder axis of the cylinder and mounted to the roof of the combustion chamber so as to be adjacent to the injector, and a diameter of the cavity on one side with respect to the cylinder axis of the cylinder may be smaller than a diameter of the cavity on another side with respect to the cylinder axis of the cylinder.

Since the diameter of the cavity on the one side on which the spark plug is disposed, among the one side and the other side across the cylinder axis of the cylinder, is relatively small, air-fuel mixture formed in the cavity immediately flows to the vicinity of the spark plug. The spark plug can assuredly ignite the air-fuel mixture in the cavity, so that the combustion stability of the SI combustion in the SICI combustion is enhanced.

An angle of the hole axis of the hole from which the fuel is injected toward one side with respect to the cylinder axis of the cylinder in the combustion chamber, relative to the cylinder axis of the cylinder, may be set so as to be smaller than that of the hole axis of the hole from which the fuel is injected toward another side with respect to the cylinder axis of the cylinder.

As described above, the magnitude of the diameter of the cavity is different depending on a position in the circumferential direction. The angle of the hole axis of each hole of the injector is changed according to the magnitude of the diameter of the cavity being changed. Accordingly, fuel spray injected from each hole collides against the opening edge and the portion near the opening edge over the entirety region in the circumferential direction of the opening edge of the cavity. As a result, in the entire region in the circumferential direction within the combustion chamber, a part of the spray flows toward the outside of the cavity, and a part of the spray flows toward the inside of the cavity.

When the operation state of the engine is in a predetermined operation region based on a detection signal from the sensor, the controller may output control signals to the state quantity setting device, the injector, and the spark plug such that the ignited air-fuel mixture is combusted by flame propagation and then unburned air-fuel mixture in the combustion chamber is combusted by autoignition; and when the operation state of the engine is in a low load region in which a load is lower than that in the predetermined operation region, or in a high load region in which the load is higher than that in the predetermined operation region, based on a detection signal from the sensor, the controller may output control signals to the state quantity setting device, the injector, and the spark plug such that air-fuel mixture in the combustion chamber is combusted by flame propagation without occurrence of combustion by autoignition.

When the operation region of the engine is divided into a low load region including an idling operation region, a high load region including a full load, and an intermediate load region between the low load region and the high load region, the "predetermined operation region" may be the intermediate load region. When the engine operates in the intermediate load region, the load on the engine is relatively high, and thus an amount of the fuel to be supplied into the combustion chamber is increased. Therefore, if combustion by autoignition is performed in the intermediate load region, pressure variation in the combustion chamber at the time of start of combustion is increased, so that combustion noise is increased.

On the other hand, in the SICI combustion, the spark plug ignites air-fuel mixture to cause combustion by flame propagation. The combustion by flame propagation is slower than combustion by autoignition, and thus combustion noise is inhibited. In addition, by performing CI combustion, the combustion period becomes shorter than that by performing combustion by flame propagation. Thus, fuel economy is advantageously improved. The SICI combustion expands the operation region in which combustion by autoignition is possible.

When the operation state of the engine is in the low load region, the amount of the fuel to be supplied into the combustion chamber is decreased. Since the amount of heat generated by combustion is small, the temperature in the combustion chamber is not increased. In addition, since the temperature of burned gas is also low, even when the burned gas is introduced in a large amount into the combustion chamber, the temperature in the combustion chamber cannot be sufficiently increased. Thus, when the operation state of the engine is in the low load region, combustion by autoignition becomes unstable.

Therefore, in the engine, when the operation state of the engine is in the low load region, air-fuel mixture in the combustion chamber is combusted by flame propagation, rather than by SICI combustion. Accordingly, when the operation state of the engine is in the low load region, combustion stability is assured. In addition, fuel economy is improved, and exhaust gas performance is improved.

Moreover, when the operation state of the engine is in the high load region, the amount of the fuel to be supplied into the combustion chamber is increased. Thus, even when SI combustion and CI combustion are combined, inhibition of combustion noise becomes difficult. Furthermore, since the temperature in the combustion chamber is increased, abnormal combustion such as preignition or knocking is likely to occur in an attempt to perform combustion by autoignition.

Therefore, in the engine, when the operation state of the engine is in the high load region, air-fuel mixture in the combustion chamber is combusted by flame propagation, rather than by SICI combustion. Accordingly, when the operation state of the engine is in the high load region, combustion noise is prevented, and abnormal combustion is avoided.

When the operation state of the engine is in an undivided injection region, in which the load is lower than a predetermined load, in the predetermined operation region, the controller may output a control signal to the injector such that the fuel is injected at once at the specific timing.

When the operation state of the engine is in the undivided injection region, the load on the engine is low, and thus the total injection amount of the fuel to be supplied into the combustion chamber is decreased. When the fuel is injected in parts at a plurality of times, the penetration of fuel spray becomes excessively weak. In order to enhance the penetration of fuel spray, the injector preferably injects the fuel at once.

When the fuel is injected at once at the above-described specific timing, the penetration of fuel spray is high, and thus the fuel spray strongly collides against the opening edge of the cavity and the portion near the opening edge of the cavity. As a result, flow of gas becomes strong in each of the regions outside and inside the cavity, so that both assuring turbulent energy in the cavity and homogeneity of air-fuel mixture in the regions inside and outside the cavity can be achieved as described above.

The state quantity setting device may have a supercharging system mounted to the engine and configured to perform supercharging with gas to be introduced into the combustion chamber; the predetermined operation region may be divided into a supercharge region and a non-supercharge region in which the load is lower than that in the supercharge region; the supercharging system may receive a control signal from the controller, perform supercharging when the operation state of the engine is in the supercharge region, and not perform supercharging when the operation state of the engine is in the non-supercharge region; and the undivided injection region may be included in the non-supercharge region. For example, a mechanical supercharger driven by the engine may be adopted. The mechanical supercharger can switch between supercharging and non-supercharging.

When the load on the engine is low, the amount of the fuel is small, and thus necessary fresh air can be introduced into the combustion chamber even if supercharging is not performed. Fuel economy is improved by not performing supercharging.

When the load on the engine is increased, the amount of the fuel is increased, and thus necessary fresh air can be introduced into the combustion chamber by performing supercharging. In addition, when supercharging is performed, the amount of gas to be introduced into the combustion chamber in addition to fresh air can be increased. When the amount of gas is increased, a heat capacity is increased. Thus, even when the amount of the fuel is increased, an increase in temperature in the combustion chamber by the SI combustion can be inhibited. Therefore, by performing supercharging, advancement of timing of autoignition of unburned air-fuel mixture can be avoided in the SICI combustion. As a result, an increase in combustion noise is avoided.

When the operation state of the engine is in the predetermined operation region, the controller may set an SI rate representing an index associated with a ratio of an amount of heat generated when air-fuel mixture is combusted by the flame propagation, relative to a total amount of heat generated when air-fuel mixture in the combustion chamber is combusted, such that the SI rate is less than 100%; and when the operation state of the engine is in the supercharge region, the controller may set the SI rate such that the SI rate is higher than that when the operation state of the engine is in the non-supercharge region.

In a combustion mode in which air-fuel mixture is combusted by flame propagation and then unburned air-fuel mixture is combusted by autoignition to complete combustion, that is, in the SICI combustion, the SI rate is less than 100%. In a combustion mode in which combustion by autoignition does not occur and combustion is completed by only combustion by flame propagation, the SI rate is 100%.

In combustion by flame propagation (that is, the SI combustion), the pressure variation is relatively small, and thus generation of combustion noise can be inhibited. In addition, in the CI combustion, the combustion period becomes shorter than that in combustion by flame propagation, so that fuel economy is advantageously improved. In the SICI combustion, when the SI rate is increased, the proportion of the SI combustion is increased, so that combustion noise is advantageously inhibited. In the SICI combustion, when the SI rate is decreased, the proportion of the CI combustion is increased, so that fuel economy is advantageously improved.

When the load on the engine is high, the amount of the fuel to be supplied into the combustion chamber is increased as compared to that when the load is low. In the above configuration, when the operation state of the engine is in the supercharge region and thus the amount of the fuel is increased, the SI rate is made higher than that when the operation state of the engine is in the non-supercharge region. Accordingly, generation of combustion noise is inhibited. Thus, even when the load on the engine is increased, the SICI combustion can be performed. Since the SICI combustion can be performed in a wide operation region, fuel economy of the engine can be advantageously improved.

When the operation state of the engine is in the low load region, the controller may output a control signal to the injector such that the fuel is injected in the intake stroke.

As described above, when the operation state of the engine is in the low load region, SICI combustion is not performed, but SI combustion is performed. When the injector injects the fuel in the intake stroke, the homogeneity of air-fuel mixture is enhanced, so that fuel economy is improved and exhaust gas performance becomes good.

The specific timing may be 70±5° CA before a compression top dead center.

According to the study by the inventors of the present invention, when the fuel is injected into the combustion chamber at timing of 70±5° CA before the compression top dead center, fuel spray collides against the opening edge of the cavity and the portion near the opening edge of the cavity, a part of the spray flows toward the outside of the cavity, and a part of the spray flows toward the inside of the cavity, as described above.

The combustion control device for the compression autoignition engine may further include a fuel supply system connected to the injector and configured to supply the fuel to the injector, and when the fuel is injected at the specific timing, the controller may output a control signal to the fuel supply system such that a pressure of the fuel is a predetermined pressure or greater.

When the pressure of the fuel is increased, the fuel spray injected from the injector can fly against the gradually increased pressure in the combustion chamber in the compression stroke, and thus assuredly collides against the opening edge of the cavity and the portion near the opening edge of the cavity.

The controller may set a state inside the combustion chamber such that a G/F representing an index associated with a mass ratio between total gas and the fuel in the combustion chamber is in a range from 18.5 to 30 and an excess air ratio $\lambda$, is 1.0±0.2, by outputting control signals to the state quantity setting device and the injector.

According to the study by the inventors of the present invention, it has been found that, when the state inside the combustion chamber is set such that $\lambda$ of air-fuel mixture is 1.0±0.2 and the G/F of the air-fuel mixture is in a range from 18.5 to 30, the SI combustion is stabilized, resulting in timing of autoignition changing, with high sensitivity, with respect to change of ignition timing. That is, in the SICI combustion, timing of autoignition can be accurately controlled.

In addition, when the state inside the combustion chamber satisfies 18.5≤G/F, the dilution rate of air-fuel mixture is high, so that fuel economy performance of the engine is improved.

Furthermore, when $\lambda$ is set to 1.0±0.2, exhaust gas can be purified by a three-way catalyst mounted in an exhaust passage of the engine.

Therefore, in the above configuration, the fuel economy performance is enhanced and exhaust gas performance is also made good, and, in addition, timing of autoignition can be accurately controlled in SICI combustion in which SI combustion and CI combustion are combined.

By controlling timing of autoignition through adjustment of ignition timing, autoignition of unburned air-fuel mixture can be performed at timing optimal for fuel economy while combustion noise is inhibited, even if the temperature in the combustion chamber before start of compression varies.

Advantages of the Invention

As described above, in the combustion control device for the compression autoignition engine, by injecting the fuel at the specific timing in the compression stroke, both assuring turbulent energy in the cavity and homogeneity of air-fuel mixture in the regions inside and outside the cavity are achieved, and timing of autoignition in the SICI combustion can be accurately controlled while fuel economy and exhaust gas performance are improved.

DESCRIPTION OF EMBODIMENTS

Figure 1:
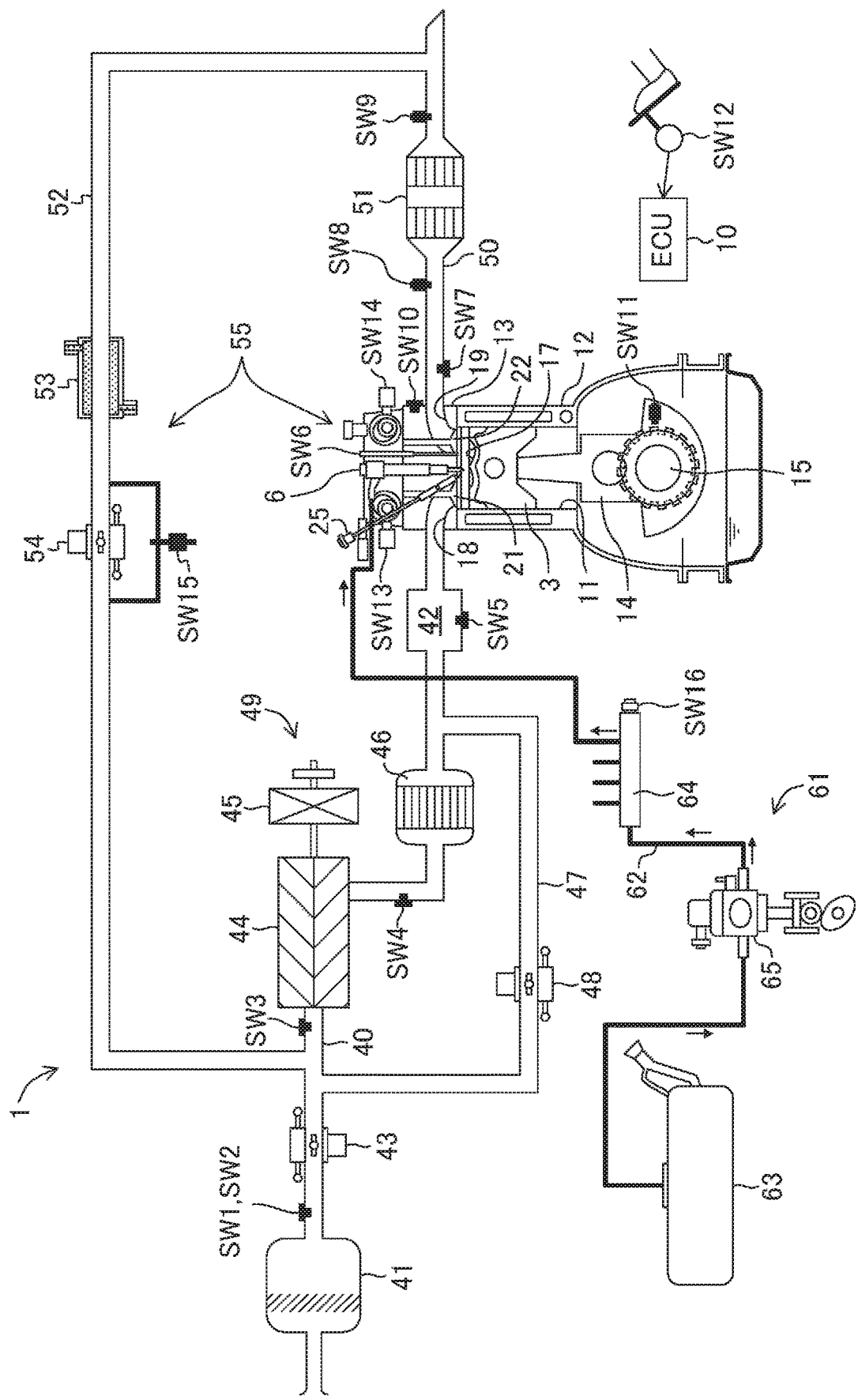
FIG. 1 illustrates the configuration of a compression autoignition engine.
Figure 2:
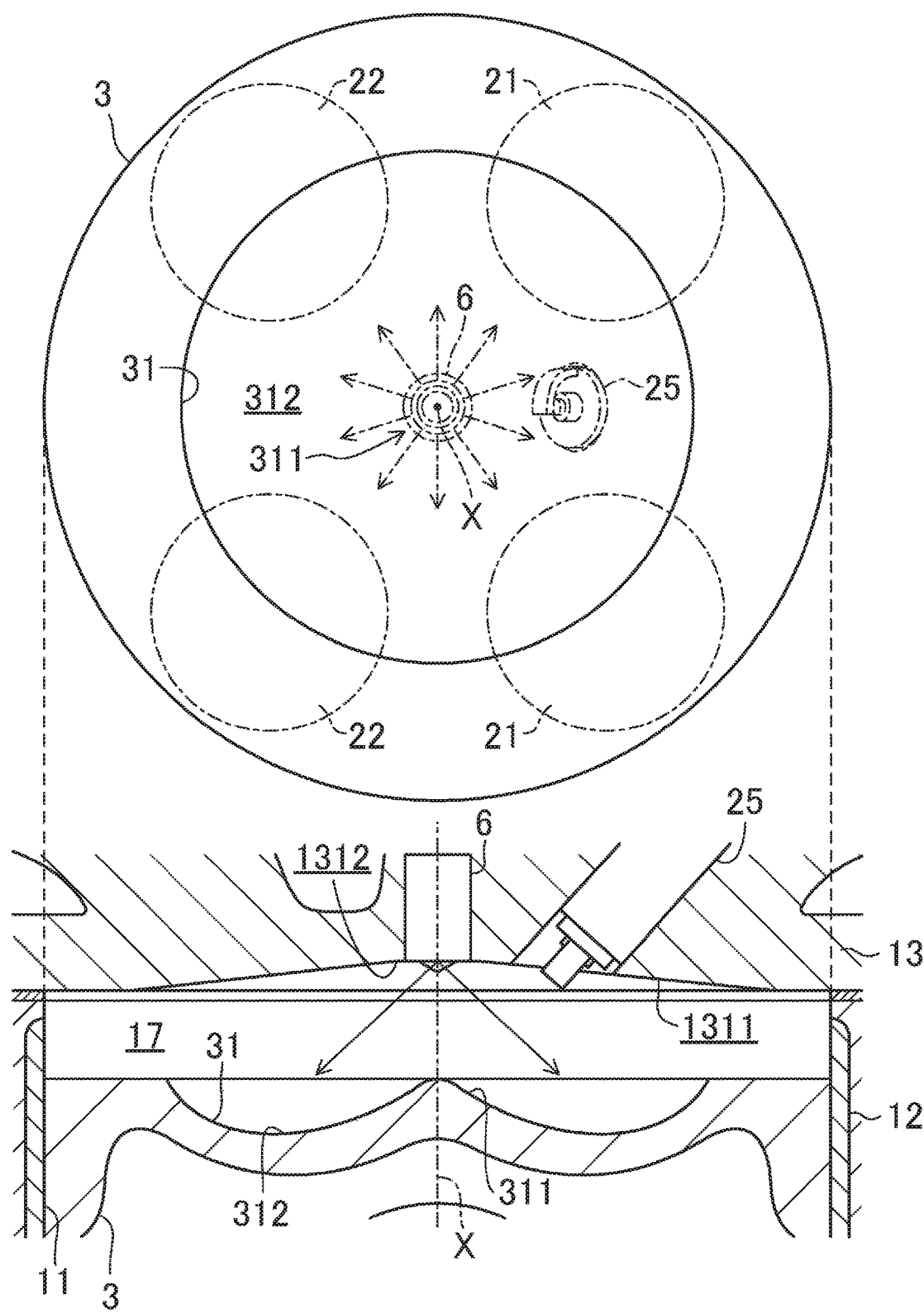
FIG. 2 is a cross-sectional view illustrating the configuration of a combustion chamber.

Hereinafter, embodiments of a combustion control device for a compression autoignition engine will be described in detail with reference to the drawings. Described below is an example of the control device for the compression autoignition engine. FIG. 1 illustrates the configuration of the compression autoignition engine. FIG. 2 is a cross-sectional view illustrating the configuration of a combustion chamber.

Figure 3:
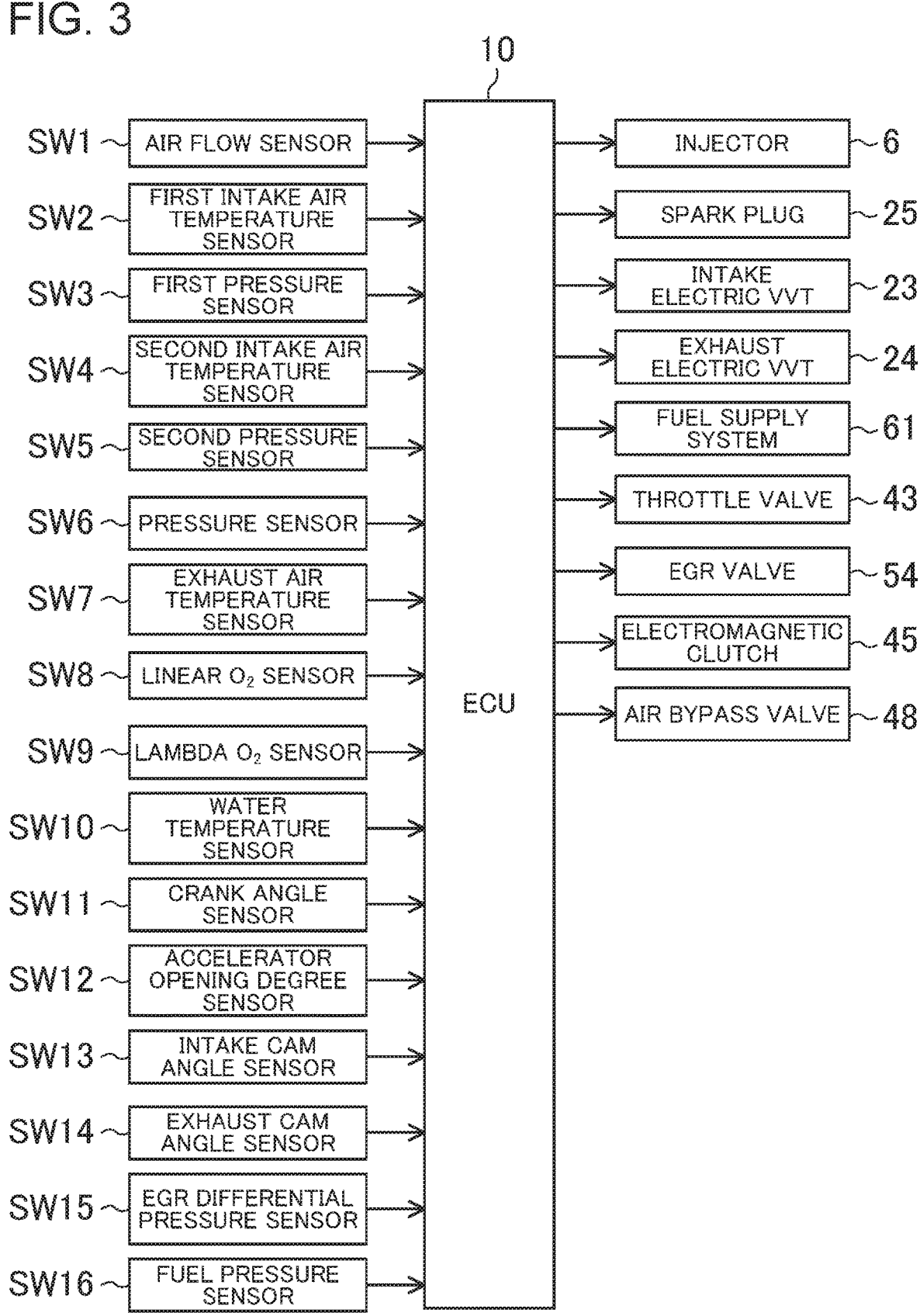
FIG. 3 is a block diagram illustrating the configuration of a control device for the compression autoignition engine.

In FIG. 1, the intake side is the left side on the drawing sheet, and the exhaust side is the right side on the drawing sheet. In FIG. 2, the intake side is the right side on the drawing sheet, and the exhaust side is the left side on the drawing sheet. FIG. 3 is a block diagram illustrating the configuration of the control device for the compression autoignition engine.

The engine 1 is mounted to a four-wheeled automobile. By operation of the engine 1, the automobile runs. Fuel for the engine 1 is gasoline in this exemplary configuration. The fuel may be gasoline that contains bioethanol or the like. The fuel for the engine 1 may be any fuel when the fuel is liquid fuel that contains at least gasoline.

(Configuration of Engine)

The engine 1 includes a cylinder block 12 and a cylinder head 13 placed thereon. A plurality of cylinders 11 are formed in the cylinder block 12. In FIG. 1 and FIG. 2, one cylinder 11 is merely illustrated. The engine 1 is a multi-cylinder engine.

In each of the cylinders 11, a piston 3 is slidably inserted. The piston 3 is connected to a crankshaft 15 via a connecting rod 14. The piston 3, the cylinder 11, and the cylinder head 13 define the combustion chamber 17. The "combustion chamber" is not limited to a space formed when the piston 3 reaches the compression top dead center. The term "combustion chamber" may be used to encompass a broader meaning. That is, the "combustion chamber" may be a space formed by the piston 3, the cylinder 11, and the cylinder head 13 regardless of the position of the piston 3.

The upper surface of the piston 3 is flat. A cavity 31 is formed in the upper surface of the piston 3. The cavity 31 is recessed from the upper surface of the piston 3. The cavity 31 is shallow-dish-shaped. The cavity 31 opposes the injector 6 described below when the piston 3 is positioned at or near the compression top dead center.

The cavity 31 has a projection 311. The projection 311 is aligned with a central axis X of the cylinder 11. The projection 311 has an almost conic shape. The projection 311 extends upward from the bottom of the cavity 31 along the central axis X of the cylinder 11. The upper end of the projection 311 has a height nearly equal to that of the upper surface of the cavity 31.

The cavity 31 also has a depressed portion 312 formed around the projection 311. The depressed portion 312 is formed so as to surround the entire circumference of the projection 311. The cavity 31 has a symmetric shape about the central axis X.

The circumferential side surface of the depressed portion 312 is inclined relative to the central axis X from the bottom surface of the cavity 31 toward the opening of the cavity 31. The inner diameter of the cavity 31 in the depressed portion 312 is gradually increased from the bottom of the cavity 31 toward the opening of the cavity 31.

The lower surface of the cylinder head 13, that is, the ceiling surface of the combustion chamber 17, is formed by an inclined surface 1311 and an inclined surface 1312 as shown in FIG. 2. The inclined surface 1311 is inclined upward from the intake side toward the central axis X. The inclined surface 1312 is inclined upward from the exhaust side toward the central axis X. The ceiling surface of the combustion chamber 17 has a so-called pent-roof shape.

The shape of the combustion chamber 17 is not limited to the shape illustrated in FIG. 2. For example, the shape of the cavity 31, the shape of the upper surface of the piston 3, the shape of the ceiling surface of the combustion chamber 17, and the like can be changed as appropriate.

The geometrical compression ratio of the engine 1 is set so as to be high for the purpose of improving theoretical thermal efficiency or stabilizing CI (Compression Ignition) combustion described later. Specifically, the geometrical compression ratio of the engine 1 is 17 or greater. The geometrical compression ratio may be, for example, 18. The geometrical compression ratio may be set in a range from 17 to 20 as appropriate.

The cylinder head 13 has two intake ports 18 formed for each cylinder 11. The intake ports 18 communicate with the combustion chamber 17. An intake valve 21 is disposed in each intake port 18. The intake valve 21 opens and closes a portion between the combustion chamber 17 and the intake port 18. The intake valve 21 is opened or closed at predetermined timing by an intake valve mechanism. In this exemplary configuration, as shown in FIG. 3, the intake valve mechanism has an intake electric VVT (Variable Valve Timing) 23 which is a variable valve mechanism. The intake electric VVT 23 is configured to sequentially change a rotational phase of an intake cam shaft in a predetermined angular range. Accordingly, the opening time and the closing time of the intake valve 21 are sequentially changed. The intake valve mechanism may have a hydraulic VVT instead of the electric VVT.

The cylinder head 13 also has two exhaust ports 19 formed for each cylinder 11. The exhaust ports 19 communicate with the combustion chamber 17. An exhaust valve 22 is disposed in each exhaust port 19. The exhaust valve 22 opens and closes a portion between the combustion chamber 17 and the exhaust port 19. The exhaust valve 22 is opened or closed at predetermined timing by an exhaust valve mechanism. In this exemplary configuration, as shown in FIG. 3, the exhaust valve mechanism has an exhaust electric VVT 24 which is a variable valve mechanism. The exhaust electric VVT 24 is configured to sequentially change a rotational phase of an exhaust cam shaft in a predetermined angular range. Thus, the opening time and the closing time of the exhaust valve 22 are sequentially changed. The exhaust valve mechanism may have a hydraulic VVT instead of the electric VVT.

As described below in detail, in the engine 1, the length of an overlap period for an opening time of the intake valve 21 and a closing time of the exhaust valve 22, is adjusted by the intake electric VVT 23 and the exhaust electric VVT 24. Accordingly, residual gas in the combustion chamber 17 is scavenged, or hot burned gas is confined in the combustion chamber 17 (that is, internal EGR (Exhaust Gas Recirculation) gas is introduced into the combustion chamber 17). In this exemplary configuration, the intake electric VVT 23 and the exhaust electric VVT 24 form an internal EGR system that is one component of a state quantity setting device. The internal EGR system may not be formed by the VVT.

The cylinder head 13 has the injector 6 mounted for each cylinder 11. The injector 6 is configured to inject fuel directly into the combustion chamber 17. The injector 6 is disposed in the valley portion of the pent-roof where the inclined surface 1311 on the intake side and the inclined surface 1312 on the exhaust side intersect each other. As shown in FIG. 2, the injector 6 is disposed such that the central axis thereof coincides with the central axis X. The central axis of the injector 6 is aligned with the projection 311 of the cavity 31. The injector 6 opposes the cavity 31. The central axis of the injector 6 may be displaced from the central axis X of the cylinder 11. Also in this case, the central axis of the injector 6 is preferably aligned with the projection 311 of the cavity 31.

The injector 6 is implemented by a multi-hole fuel injection valve having a plurality of holes, which is not shown in detail. The injector 6 injects fuel so as to spread fuel spray radially from the center of the combustion chamber 17 as indicated by arrows in FIG. 2.

As described below, the injector 6 may inject fuel at timing when the piston 3 is positioned at or near the compression top dead center. In this case, when the injector 6 injects fuel, fuel spray flows downward along the projection 311 of the cavity 31 while mixing with fresh air, and flows so as to spread radially from the center of the combustion chamber 17 along the bottom surface and the circumferential side surface of the depressed portion 312 in the radially outward direction. Thereafter, air-fuel mixture reaches the opening of the cavity 31, and flows from the radially outer side, along the inclined surface 1311 on the intake side and the inclined surface 1312 on the exhaust side, toward the center of the combustion chamber 17.

The injector 6 may not be a multi-hole injector. The injector 6 may be an outward-opening valve type injector.

A fuel supply system 61 is connected to the injector 6. The fuel supply system 61 has a fuel tank 63 configured to store fuel, and a fuel supply passage 62 that connects the fuel tank 63 and the injector 6 to each other. In the fuel supply passage 62, a fuel pump 65 and a common rail 64 are disposed. The fuel pump 65 feeds fuel to the common rail 64 under pressure. In this exemplary configuration, the fuel pump 65 is a plunger-type pump driven by the crankshaft 15. The common rail 64 is configured to store fuel having been fed under pressure from the fuel pump 65, with a high fuel pressure. When the injector 6 opens, the fuel stored in the common rail 64 is injected through the hole of the injector 6 into the combustion chamber 17. The fuel supply system 61 is configured to be capable of supplying, to the injector 6, fuel under a high pressure of 30 MPa or higher. The highest fuel pressure in the fuel supply system 61 may be, for example, about 120 MPa. The pressure of fuel to be supplied to the injector 6 may be changed according to an operation state of the engine 1. The configuration of the fuel supply system 61 is not limited to the above-described one.

The cylinder head 13 has the spark plug 25 mounted for each cylinder 11. The spark plug 25 forcibly ignites air-fuel mixture in the combustion chamber 17. In this exemplary configuration, the spark plug 25 is disposed on the intake side with respect to the central axis X of the cylinder 11. The spark plug 25 is adjacent to the injector 6. The spark plug 25 is disposed between the two intake ports 18. The spark plug 25 is mounted to the cylinder head 13 so as to be inclined from the upper side to the lower side toward the center of the combustion chamber 17. The electrode of the spark plug 25 faces the inside of the combustion chamber 17 and is disposed near the ceiling surface of the combustion chamber 17 as shown in FIG. 2.

An intake passage 40 is connected to one side surface of the engine 1. The intake passage 40 communicates with the intake port 18 of each cylinder 11. Through the intake passage 40, gas to be introduced into the combustion chamber 17 flows. An air cleaner 41 for filtering fresh air is disposed at the upstream end portion of the intake passage 40. A surge tank 42 is disposed near the downstream end of the intake passage 40. The intake passage 40 disposed downstream of the surge tank 42 forms independent passages that diverge for the respective cylinders 11, which is not shown in detail. The downstream end of the independent passage is connected to the intake port 18 of each cylinder 11.

A throttle valve 43 is disposed between the air cleaner 41 and the surge tank 42 in the intake passage 40. A valve opening degree of the throttle valve 43 is adjusted, whereby an amount of fresh air to be introduced into the combustion chamber 17 is adjusted. The throttle valve 43 is one component of the state quantity setting device.

A supercharger 44 is disposed downward of the throttle valve 43 in the intake passage 40. The supercharger 44 is configured to perform supercharging with gas that is to be introduced into the combustion chamber 17. In this exemplary configuration, the supercharger 44 is a mechanical supercharger driven by the engine 1. The mechanical supercharger 44 may be, for example, of a Roots type. The mechanical supercharger 44 may have any structure. The mechanical supercharger 44 may be of a Lysholm type or a centrifugal type.

An electromagnetic clutch 45 is disposed between the supercharger 44 and the engine 1. Between the supercharger 44 and the engine 1, the electromagnetic clutch 45 transmits driving force from the engine 1 to the supercharger 44 and interrupts transmission of driving force. As described below, an ECU 10 switches between disengagement and engagement of the electromagnetic clutch 45, whereby the supercharger 44 switches between on and off. That is, the engine 1 is configured to switch between a state where the supercharger 44 performs supercharging with gas that is to be introduced into the combustion chamber 17 and a state where the supercharger 44 does not perform supercharging with gas that is to be introduced into the combustion chamber 17.

An intercooler 46 is disposed downward of the supercharger 44 in the intake passage 40. The intercooler 46 is configured to cool gas compressed by the supercharger 44. The intercooler 46 may be, for example, of a water-cooling type.

A bypass passage 47 is connected to the intake passage 40. The bypass passage 47 connects the upstream portion of the supercharger 44 and the downstream portion of the intercooler 46 to each other in the intake passage 40 so as to bypass the supercharger 44 and the intercooler 46. An air bypass valve 48 is disposed in the bypass passage 47. The air bypass valve 48 adjusts a flow rate of gas that flows in the bypass passage 47.

When the supercharger 44 is off (that is, the electromagnetic clutch 45 is disengaged), the air bypass valve 48 is fully opened. Thus, gas that flows in the intake passage 40 bypasses the supercharger 44 and is introduced into the combustion chamber 17 of the engine 1. The engine 1 operates in a non-supercharged state, that is, by natural aspiration.

When the supercharger 44 is on (that is, the electromagnetic clutch 45 is engaged), a part of gas that passes through the supercharger 44 flows back to the upstream side of the supercharger through the bypass passage 47. By the opening degree of the air bypass valve 48 being adjusted, an amount of backflow can be adjusted, whereby boost pressure for gas to be introduced into the combustion chamber 17 can be adjusted. In this exemplary configuration, a supercharging system 49 is formed by the supercharger 44, the bypass passage 47, and the air bypass valve 48. The air bypass valve 48 is one component of the state quantity setting device.

An exhaust passage 50 is connected to the other side surface of the engine 1. The exhaust passage 50 communicates with the exhaust port 19 of each cylinder 11. Through the exhaust passage 50, exhaust gas discharged from the combustion chamber 17 flows. The upstream portion of the exhaust passage 50 forms independent passages that diverge for the respective cylinders 11, which is not shown in detail. The upstream end of the independent passage is connected to the exhaust port 19 of each cylinder 11. In the exhaust passage 50, an exhaust gas purification system having one or more catalytic converters 51 is disposed. Each catalytic converter 51 is configured to include a three-way catalyst. The exhaust gas purification system is not limited to one including only a three-way catalyst.

An EGR passage 52 that forms an external EGR system is connected between the intake passage 40 and the exhaust passage 50. The EGR passage 52 is a passage for recirculating a part of burned gas into the intake passage 40. The upstream end of the EGR passage 52 is connected to a portion downstream of the catalytic converters 51 in the exhaust passage 50. The downstream end of the EGR passage 52 is connected to a portion upstream of the supercharger 44 in the intake passage 40.

A water-cooling type EGR cooler 53 is disposed in the EGR passage 52. The EGR cooler 53 is configured to cool burned gas. An EGR valve 54 is also disposed in the EGR passage 52. The EGR valve 54 is configured to adjust a flow rate of burned gas that flows in the EGR passage 52. The opening degree of the EGR valve 54 is adjusted, whereby an amount of cooled burned gas, that is, external EGR gas, to be recirculated can be adjusted.

In this exemplary configuration, an EGR system 55 is structured by the external EGR system that includes the EGR passage 52 and the EGR valve 54, and the internal EGR system that includes the intake electric VVT 23 and the exhaust electric VVT 24 described above. Furthermore, the EGR valve 54 is one component of the state quantity setting device.

The control device for the compression autoignition engine includes the ECU (Engine Control Unit) 10 for operating the engine 1. The ECU 10 is a controller based on a known microcomputer. The ECU 10 includes a central processing unit (CPU) for executing a program, a memory implemented by, for example, a RAM (Random Access Memory) or a ROM (Read Only Memory) for storing programs and data, and an input/output bus for inputting and outputting an electrical signal. The ECU 10 is an example of a controller.

As shown in FIG. 1 and FIG. 3, various sensors SW1 to SW16 are connected to the ECU 10. The sensors SW1 to SW16 output detection signals to the ECU 10. The sensors include sensors described below.

That is, the sensors include: an air flow sensor SW1, disposed downstream of the air cleaner 41 in the intake passage 40, for detecting a flow rate of fresh air that flows in the intake passage 40; a first intake air temperature sensor SW2, disposed downstream of the air cleaner 41 in the intake passage 40, for detecting a temperature of fresh air; a first pressure sensor SW3, disposed downstream of a position at which the EGR passage 52 is connected to the intake passage 40 and disposed upstream of the supercharger 44, for detecting pressure of gas that flows into the supercharger 44; a second intake air temperature sensor SW4, disposed downstream of the supercharger 44 in the intake passage 40 and disposed upstream of a position at which the bypass passage 47 is connected to the intake passage 40, for detecting a temperature of gas that flows from the supercharger 44; a second pressure sensor SW5 mounted to the surge tank 42 for detecting pressure of gas flowing downstream of the supercharger 44; pressure sensors SW6, mounted to the cylinder heads 13 so as to correspond to the cylinders 11, respectively, each of which detects pressure in the combustion chamber 17; an exhaust air temperature sensor SW7 disposed in the exhaust passage 50 for detecting a temperature of exhaust gas discharged from the combustion chamber 17; a linear $O_2$ sensor SW8, disposed upstream of the catalytic converters 51 in the exhaust passage 50, for detecting the concentration of oxygen in exhaust gas; a lambda $O_2$ sensor SW9, disposed downstream of the catalytic converters 51 in the exhaust passage 50, for detecting the concentration of oxygen in exhaust gas; a water temperature sensor SW10 mounted to the engine 1 for detecting a temperature of cooling water; a crank angle sensor SW11 mounted to the engine 1 for detecting a rotational angle of the crankshaft 15; an accelerator opening degree sensor SW12 mounted to an accelerator pedal mechanism for detecting an accelerator opening degree corresponding to an amount of operation of an accelerator pedal; an intake cam angle sensor SW13 mounted to the engine 1 for detecting a rotational angle of an intake cam shaft; an exhaust cam angle sensor SW14 mounted to the engine 1 for detecting a rotational angle of an exhaust cam shaft; an EGR differential pressure sensor SW15 disposed in the EGR passage 52 for detecting a differential pressure between the upstream side and the downstream side of the EGR valve 54; and a fuel pressure sensor SW16, mounted to the common rail 64 of the fuel supply system 61, for detecting pressure of fuel to be supplied to the injector 6.

The ECU 10 determines an operation state of the engine 1 and calculates a control amount for each device, based on the detection signals. The ECU 10 outputs control signals based on the calculated control amounts, to the injector 6, the spark plug 25, the intake electric VVT 23, the exhaust electric VVT 24, the fuel supply system 61, the throttle valve 43, the EGR valve 54, the electromagnetic clutch 45 of the supercharger 44, and the air bypass valve 48. For example, the ECU 10 adjusts the boost pressure by adjusting the opening degree of the air bypass valve 48 based on the differential pressure, between the front side and the rear side of the supercharger 44, obtained according to detection signals from the first pressure sensor SW3 and the second pressure sensor SW5. In addition, the ECU 10 adjusts an amount of external EGR gas to be introduced into the combustion chamber 17, by adjusting the opening degree of the EGR valve 54 based on the differential pressure, between the front side and the rear side of the EGR valve 54, obtained according to a detection signal from the EGR differential pressure sensor SW15. The control of the engine 1 by the ECU 10 will be described in detail later.

(Operation Region of Engine)

Figure 4:
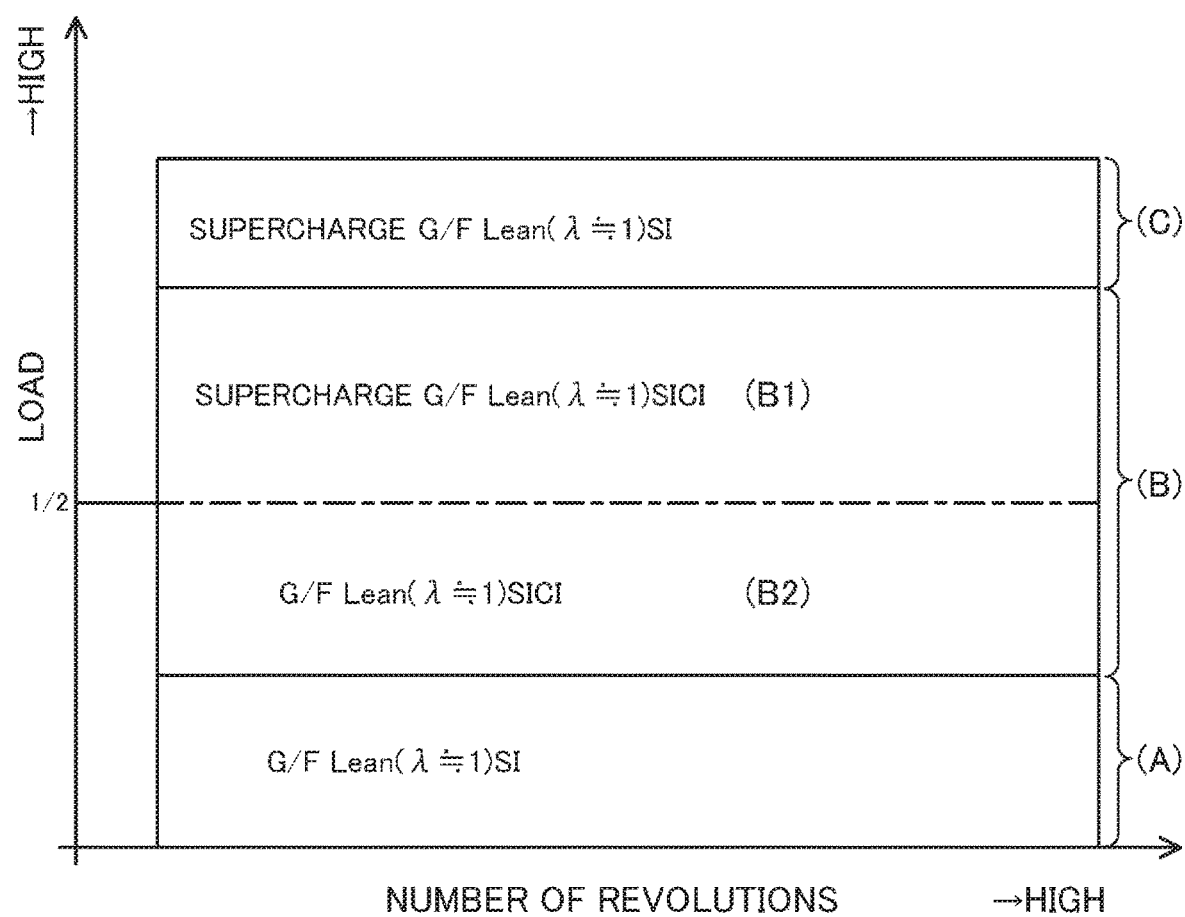
FIG. 4 illustrates the operation region of the engine.

FIG. 4 illustrates the operation region of the engine 1. The operation region of the engine 1 is roughly divided into three regions based on the magnitude of a load. Specifically, the three regions are a low load region (A) that includes an idling operation region, a high load region (C) that includes a full load, and an intermediate load region (B) between the low load region (A) and the high load region (C). In the engine 1, combustion by compression autoignition is performed in the intermediate load region mainly for improving fuel economy and improving exhaust gas performance. Hereinafter, combustion modes in the low load region, the intermediate load region, and the high load region, respectively, will be sequentially described.

(Low Load Region)

When the operation state of the engine 1 is in the low load region, an amount of injected fuel is small. Thus, the amount of heat generated when air-fuel mixture is combusted in the combustion chamber 17 is small, and thus the temperature of the combustion chamber 17 is decreased. In addition, since the temperature of exhaust gas is also decreased, even when internal EGR gas is introduced into the combustion chamber 17 as described later, the temperature in the combustion chamber 17 is not increased to such a degree that autoignition is stably enabled. When the operation state of the engine 1 is in the low load region, the combustion mode is SI (Spark Ignition) combustion in which the spark plug 25 ignites air-fuel mixture in the combustion chamber 17 and the air-fuel mixture is thus combusted by flame propagation. Hereinafter, the combustion mode in the low load region is also referred to as low load SI combustion.

When the operation state of the engine 1 is in the low load region, an air-fuel ratio (A/F) of air-fuel mixture is the theoretical air-fuel ratio (A/F=14.7). Exhaust gas discharged from the combustion chamber 17 is purified by the three-way catalyst, whereby the engine 1 has good exhaust gas performance. The A/F of air-fuel mixture may be set so as to fall within a purification window of the three-way catalyst. Therefore, the excess air ratio $\lambda$ of the air-fuel mixture may be set to 1.0±0.2.

When the operation state of the engine 1 is in the low load region, the EGR system 55 introduces EGR gas into the combustion chamber 17 in order to improve fuel economy performance of the engine 1. The G/F of the air-fuel mixture, that is, a mass ratio between the total gas and fuel in the combustion chamber 17 is set in a range from 18.5 to 30. The air-fuel mixture is EGR gas lean. The dilution rate of the air-fuel mixture is high. When the G/F of the air-fuel mixture is, for example, 25, SI combustion can be stably performed without causing autoignition of the air-fuel mixture, in the low load operation region. In the low load region, the G/F of the air-fuel mixture is uniformly maintained regardless of whether or not the load on the engine 1 is high or low. Thus, the SI combustion is stabilized over the entirety of the low load region. Furthermore, fuel economy of the engine 1 is improved, and exhaust gas performance becomes good.

When the operation state of the engine 1 is in the low load region, an amount of fuel is small. Therefore, in order to set $\lambda$ of the air-fuel mixture to 1.0±0.2 and set the G/F in a range from 18.5 to 30, an amount of gas to be filled in the combustion chamber 17 needs to be less than 100%. Specifically, the engine 1 performs throttling for adjusting the opening degree of the throttle valve 43 and/or Miller cycle for delaying the closing time of the intake valve 21 to the intake bottom dead center or later.

In the low-load low-rotation region in the low load region, an amount of filled gas is further reduced, whereby the combustion temperature of the air-fuel mixture and the temperature of exhaust gas may be increased. Thus, the catalytic converters 51 are advantageously maintained in an active state.

(Intermediate Load Region)

When the operation state of the engine 1 is in the intermediate load region, an amount of injected fuel is increased. The temperature in the combustion chamber 17 becomes high, whereby autoignition can be stably performed. The engine 1 performs CI combustion in the intermediate load region in order to improve fuel economy and improve exhaust gas performance.

In combustion by autoignition, if the temperature in the combustion chamber 17 before start of compression varies, timing of autoignition is greatly changed. Therefore, in the intermediate load region, the engine 1 performs SICI combustion in which SI combustion and CI combustion are combined. In the SICI combustion, the spark plug 25 forcibly ignites air-fuel mixture in the combustion chamber 17, and the air-fuel mixture is thus combusted by flame propagation, and unburned air-fuel mixture is combusted by autoignition due to heat generation by the SI combustion increasing the temperature in the combustion chamber 17. By adjusting an amount of heat generated by the SI combustion, variation of the temperature in the combustion chamber 17 before start of compression can be absorbed. Even if the temperature in the combustion chamber 17 before start of compression varies, when the start timing of the SI combustion is adjusted by, for example, adjustment of ignition timing, timing of autoignition can be controlled.

In the SICI combustion, in order to accurately control the timing of autoignition, the timing of autoignition needs to change according to the ignition timing being changed. Sensitivity for change of timing of autoignition with respect to change of ignition timing is preferably high.

The inventors of the present invention have found through study that, when λ of air-fuel mixture is 1.0±0.2 and the G/F of the air-fuel mixture is in a range from 18.5 to 30, timing of autoignition changes with respect to change of ignition timing. Therefore, when the operation state of the engine 1 is in the intermediate load region, the engine 1 sets the state inside the combustion chamber 17 such that λ of air-fuel mixture is 1.0±0.2 and the G/F of the air-fuel mixture is in a range from 18.5 to 30.

By timing of autoignition being accurately controlled, increase of combustion noise can be avoided when the operation state of the engine 1 is in the intermediate load region. Furthermore, a dilution rate of the air-fuel mixture is set to be as high as possible to perform CI combustion, whereby the engine 1 can have high fuel economy performance. Moreover, λ of air-fuel mixture is set to 1.0±0.2, whereby exhaust gas can be purified by the three-way catalyst, so that the engine 1 has good exhaust gas performance.

As described above, in the low load region, the G/F of air-fuel mixture is in a range from 18.5 to 30 (for example, 25), and λ of the air-fuel mixture is set to 1.0±0.2. The state quantity of the combustion chamber 17 does not greatly change between when the operation state of the engine 1 is in the low load region and when the operation state of the engine 1 is in the intermediate load region. Therefore, robustness of control of the engine 1 with respect to change of load on the engine 1 is enhanced.

When the operation state of the engine 1 is in the intermediate load region, an amount of fuel is increased unlike in the low load region. Therefore, an amount of gas to be filled in the combustion chamber 17 need not be adjusted. The opening degree of the throttle valve 43 is a fully open degree.

When load on the engine 1 is increased and an amount of fuel is further increased, an amount of gas introduced into the combustion chamber 17 by natural aspiration is insufficient for setting λ of air-fuel mixture to 1.0±0.2 and setting the G/F of the air-fuel mixture in a range from 18.5 to 30. Therefore, the supercharger 44 supercharges the combustion chamber 17 with gas to be introduced thereinto, in a region in which load is higher than a predetermined load in the intermediate load region. The intermediate load region (B) is divided into a first intermediate load region (B1) in which the load is higher than a predetermined load and supercharging is performed, and a second intermediate load region (B2) in which the load is the predetermined load or lower load and no supercharging is performed. The predetermined load is, for example, ½ load. The second intermediate load region is a region in which load is lower than load in the first intermediate load region. Hereinafter, the combustion mode in the first intermediate load region is also referred to as supercharge SICI combustion, and the combustion mode in the second intermediate load region is also referred to as non-supercharge SICI combustion.

In the second intermediate load region in which no supercharging is performed, as an amount of fuel is increased, fresh air to be introduced into the combustion chamber 17 is increased, while EGR gas is reduced. The G/F of the air-fuel mixture is reduced when load on the engine 1 is increased. Since the opening degree of the throttle valve 43 is a fully open degree, the engine 1 adjusts an amount of EGR gas to be introduced into the combustion chamber 17, whereby an amount of fresh air to be introduced into the combustion chamber 17 is adjusted. In the second intermediate load region, the state quantity of the combustion chamber 17 is such that, for example, λ of the air-fuel mixture is almost uniformly 1.0, while the G/F of the air-fuel mixture changes in a range from 25 to 28.

Meanwhile, in the first intermediate load region in which supercharging is performed, as an amount of fuel is increased, both fresh air and EGR gas to be introduced into the combustion chamber 17 are increased, in the engine 1. The G/F of the air-fuel mixture is constant even when the load on the engine 1 is increased. In the first intermediate load region, the state quantity of the combustion chamber 17 is such that, for example, λ of the air-fuel mixture is almost uniformly 1.0 and the G/F of the air-fuel mixture is uniformly 25.

(High Load Region)

When the operation state of the engine 1 is in the high load region, an amount of injected fuel is large. Therefore, even when SICI combustion is performed, inhibition of combustion noise becomes difficult. In addition, since the temperature in the combustion chamber 17 is increased, abnormal combustion such as preignition or knocking is likely to occur in an attempt to perform CI combustion. Thus, when the operation state of the engine 1 is in the high load region, the combustion mode is SI combustion. Hereinafter, the combustion mode in the high load region is also referred to as high load SI combustion.

When the operation state of the engine 1 is in the high load region, λ of the air-fuel mixture is 1.0±0.2. Furthermore, the G/F of the air-fuel mixture is basically set in a range from 18.5 to 30. In the high load region, the opening degree of the throttle valve 43 is a fully open degree, and the supercharger 44 performs supercharging.

In the high load region, an amount of EGR gas is reduced according to load being increased in the engine 1. The G/F of the air-fuel mixture becomes small when the load on the engine 1 is increased. An amount of fresh air to be introduced into the combustion chamber 17 is increased according to an amount of the EGR gas being reduced. Therefore, an amount of fuel can be increased. The maximum output of the engine 1 is advantageously enhanced. At or around the full load, the G/F of the air-fuel mixture may be set to about 17.

In the high load region, the G/F of the air-fuel mixture may be changed, for example, in a range of 17 to 25. Therefore, in the entire operation region of the engine 1 including the low load region, the intermediate load region, and the high load region, the G/F of the air-fuel mixture may be changed in a range of 17 to 30.

The state quantity of the combustion chamber 17 does not greatly change between when the operation state of the engine 1 is in the high load region and when the operation state of the engine 1 is the intermediate load region. Robustness of control of the engine 1 with respect to change of load on the engine 1 is enhanced.

(Sensitivity for Change of Timing of Autoignition)

Sensitivity for change of timing of autoignition with respect to change of ignition timing in the above-described SICI combustion will be described. The inventors of the present invention have found through study that, in order for timing of autoignition to change with respect to change of ignition timing in the SICI combustion, SI combustion by flame propagation needs to be stably performed before autoignition of air-fuel mixture occurs.

One of factors associated with stability of the SI combustion is a turbulent combustion speed. When the turbulent combustion speed is high, the SI combustion is stabilized. The turbulent combustion speed is influenced by an air-fuel ratio (or excess air ratio $\lambda$) of air-fuel mixture, an EGR (Exhaust Gas Recirculation) ratio (that is, dilution rate) of the air-fuel mixture, a temperature and a pressure in the combustion chamber 17, turbulent energy in the combustion chamber 17, or the like.

The inventors of the present invention have examined, through simulation, an excess air ratio $\lambda$ of air-fuel mixture, a dilution rate (in the description herein, G/F that is a mass ratio between the total gas and fuel in the combustion chamber 17) of the air-fuel mixture, a temperature and a pressure in the combustion chamber 17, and turbulent energy in the combustion chamber 17, for obtaining a turbulent combustion speed necessary for assuring stability of the SI combustion. The condition for the simulation is a condition that the engine 1 operates with a low load, and only internal EGR gas is introduced into the combustion chamber 17, to make the temperature in the combustion chamber 17 as high as possible.

From the viewpoint of assuredly avoiding great combustion noise caused by knocking, the lower limit of the G/F of air-fuel mixture is 18.5. In addition, when the air-fuel ratio is such a lean air-fuel ratio and a three-way catalyst is used in order to prevent NOx emissions, the excess air ratio $\lambda$ of the air-fuel mixture is 1.0±0.2.

Figure 19:
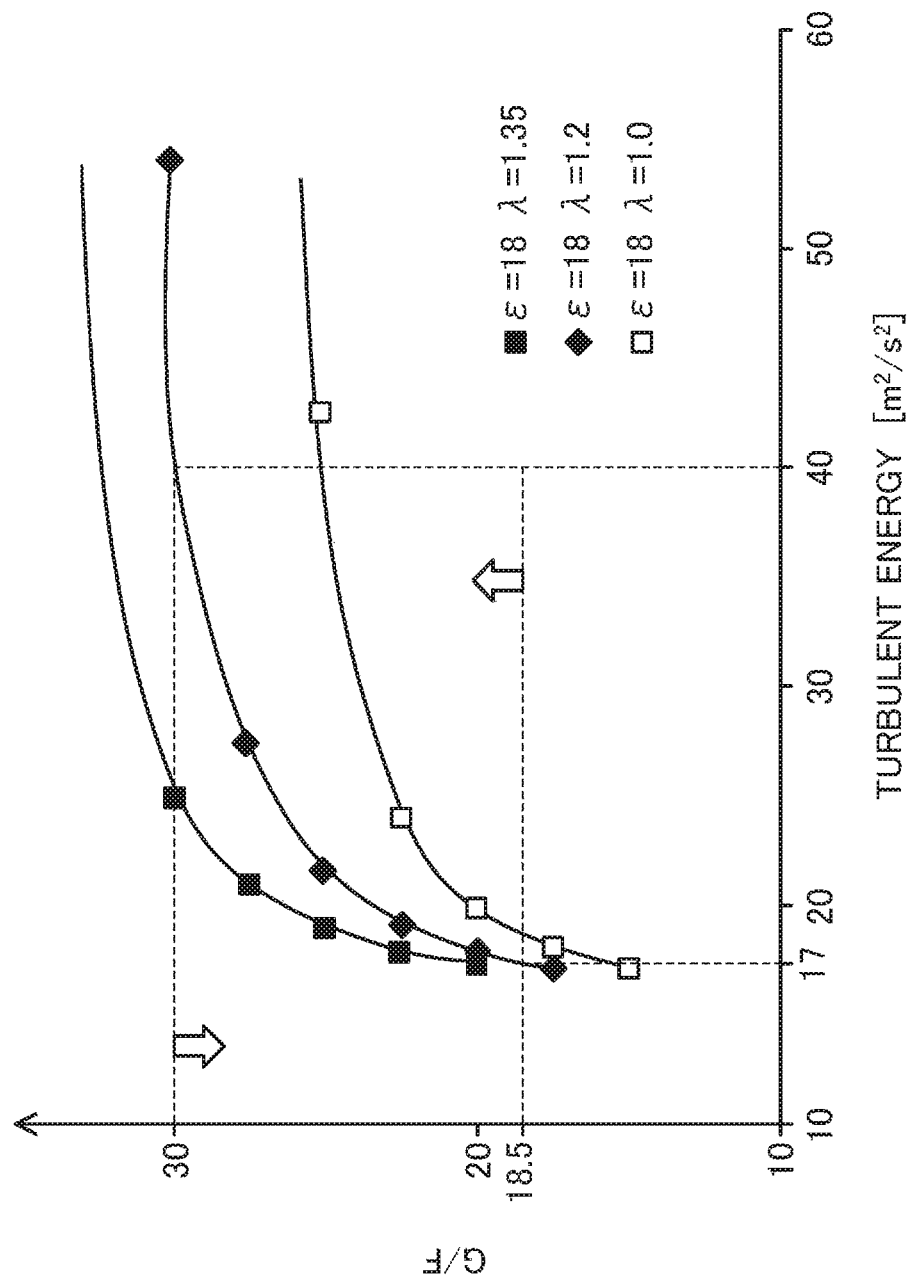
FIG. 19 illustrates a relationship, between G/F of air-fuel mixture and turbulent energy necessary for achieving a desired turbulent combustion speed, established when the engine operates at a predetermined number of revolutions at a low load and only internal EGR gas is introduced into the combustion chamber.

From the viewpoint of enhancing fuel economy performance of the engine 1, the G/F of air-fuel mixture is preferably great. Therefore, the inventors of the present invention have examined a relationship between the G/F of air-fuel mixture and turbulent energy necessary for obtaining a desired turbulent combustion speed as shown in FIG. 19. The engine 1 operates at 2000 rpm as the number of revolutions with a low load. Furthermore, internal EGR gas is introduced into the combustion chamber 17. The closing time of the intake valve 21 is 91° ABDC. The geometrical compression ratio of the engine 1 is 18.

According to FIG. 19, when $\lambda$ of the air-fuel mixture is 1.2, the characteristic line of the G/F is like a saturation curve representing saturation at about 30. Meanwhile, when the number of revolutions of the engine 1 is 2000 rpm, turbulent energy of 40 $m^2/s^2$ can be obtained. It has been newly found that, even if the turbulent energy is obtained so as to be greater than 40 $m^2/s^2$, the G/F of the air-fuel mixture is not likely to be greater than 30. According to FIG. 19, the upper limit of the G/F of the air-fuel mixture is 30 in order to assure stability of the SI combustion.

According to the above-described examination, the G/F of air-fuel mixture needs to be set in a range from 18.5 to 30. According to FIG. 19, when $\lambda$ of the air-fuel mixture is 1.0 or 1.2, and the range of the G/F is a range from 18.5 to 30, the range of the turbulent energy necessary for stabilizing the SI combustion is 17 to 40 $m^2/s^2$.

Figure 20:
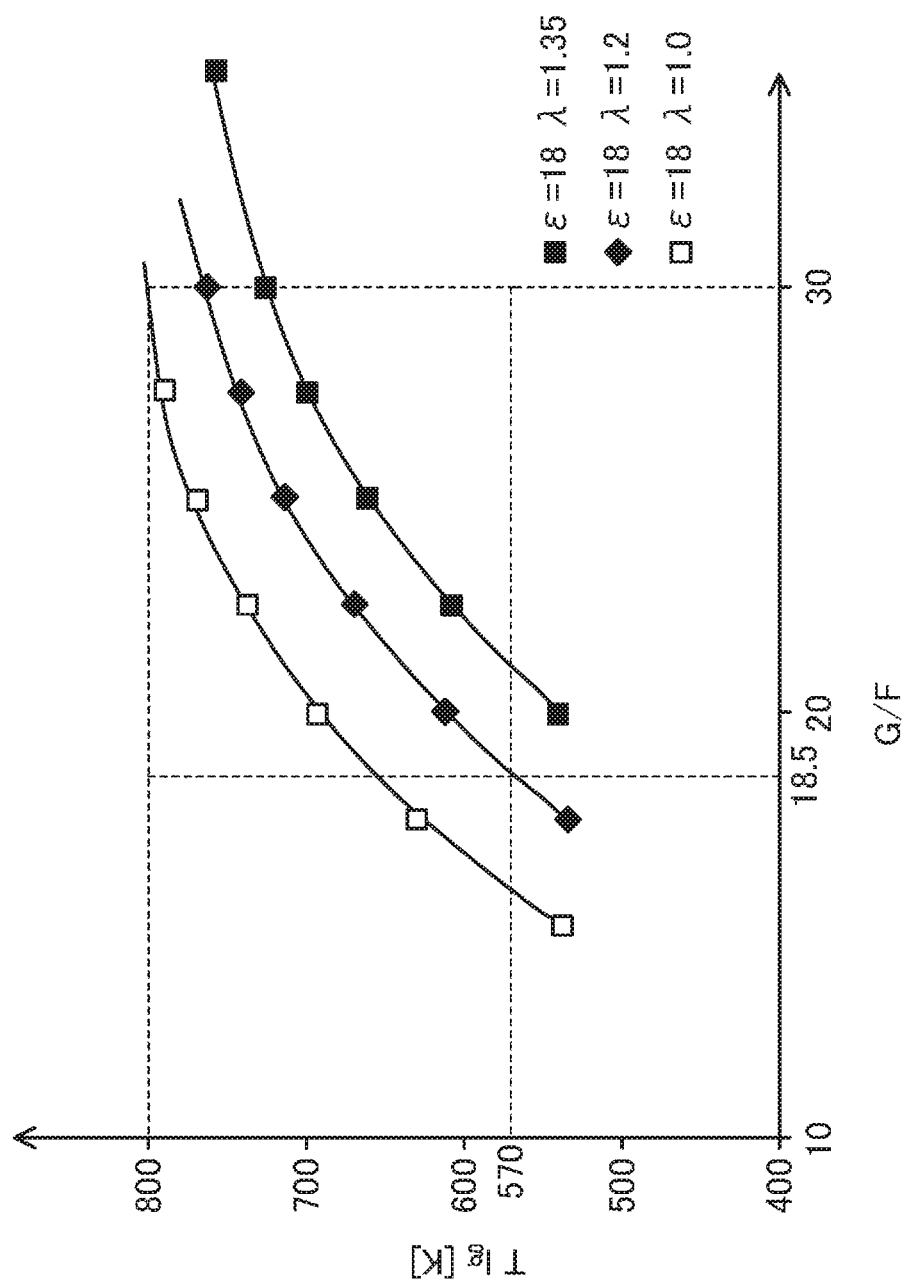
FIG. 20 illustrates a relationship between G/F of air-fuel mixture and temperature in the combustion chamber for achieving the necessary turbulent energy illustrated in FIG. 19.

FIG. 20 illustrates a relationship, between temperature at ignition timing and G/F of air-fuel mixture in the combustion chamber 17, which is necessary for achieving a desired turbulent combustion speed, under the same condition as in FIG. 19. When $\lambda$ of the air-fuel mixture is 1.0 or 1.2, and the range of the G/F is a range from 18.5 to 30, a necessary temperature TIg (K) in the combustion chamber 17 at ignition timing is 570 to 800 K.

Figure 21:
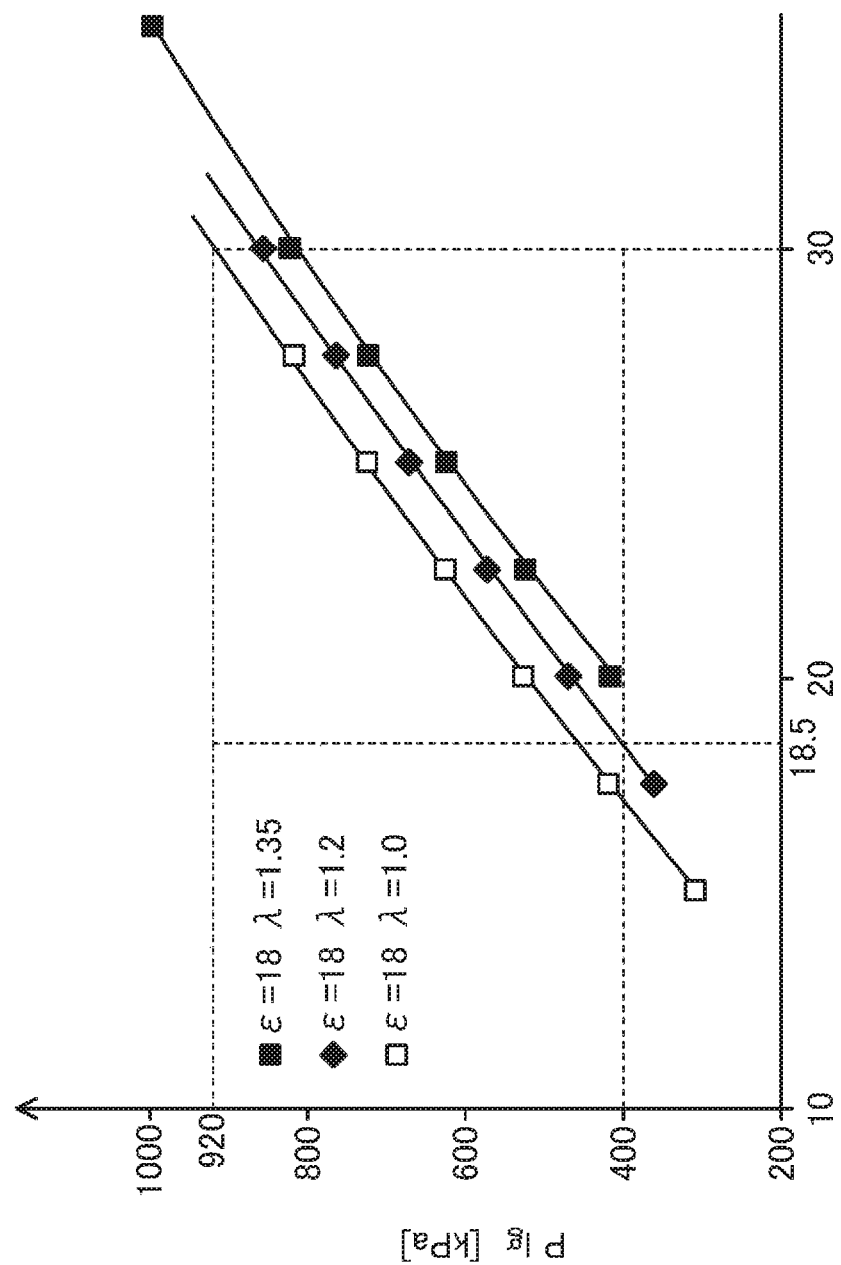
FIG. 21 illustrates a relationship between G/F of air-fuel mixture and pressure in the combustion chamber for achieving the necessary turbulent energy illustrated in FIG. 19.

FIG. 21 illustrates a relationship, between pressure at ignition timing and G/F of air-fuel mixture in the combustion chamber 17, which is necessary for achieving a desired turbulent combustion speed, under the same condition as in FIG. 19. When $\lambda$ of the air-fuel mixture is 1.0 or 1.2, and the range of the G/F is a range from 18.5 to 30, a necessary pressure PIg (kPa) in the combustion chamber 17 at ignition timing is 400 to 920 kPa.

Even if the geometrical compression ratio of the engine 1 is changed in a range of 14 to 20, there is almost no influence on a relationship between the G/F of air-fuel mixture and turbulent energy necessary for achieving a desired turbulent combustion speed, which is not shown.

Figure 22:
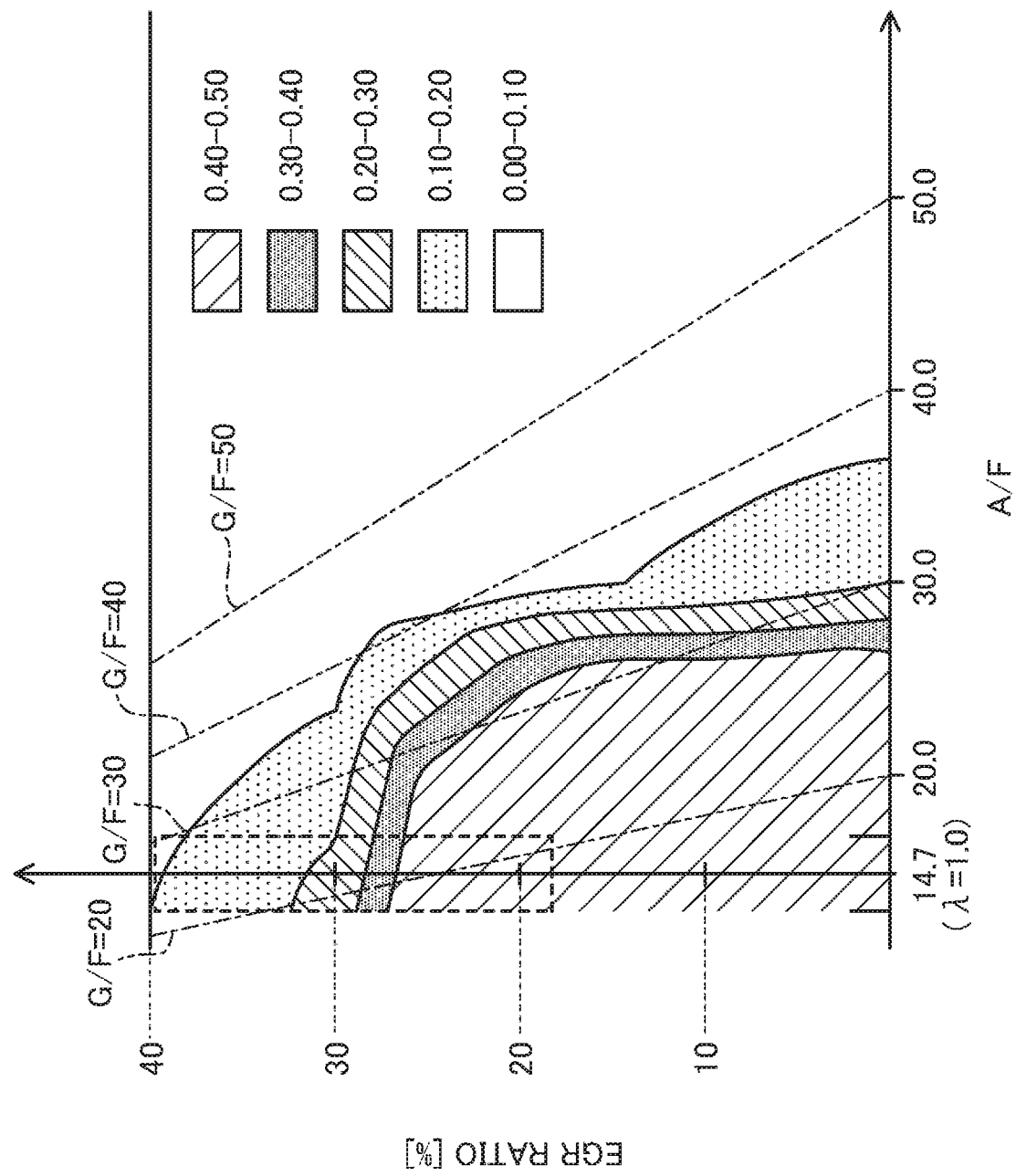
FIG. 22 is a contour diagram showing contours on a plane in which the vertical axis represents an EGR ratio of air-fuel mixture and the horizontal axis represents an A/F of the air-fuel mixture, illustrating a change rate of change of autoignition timing with respect to change of ignition timing in SICI combustion.

FIG. 22 is a contour diagram showing a change rate of change of autoignition timing with respect to change of ignition timing (=(change of crank angle at autoignition timing)/(change of crank angle at ignition timing)), which is obtained by experiment. The change rate represents a magnitude of change, of a crank angle at autoignition timing, obtained when ignition timing is changed by 1° as a crank angle. The higher the value of the change rate is, the higher the sensitivity for change of timing of autoignition with respect to change of ignition timing is. The lower the value of the change rate is, the lower the sensitivity for change of timing of autoignition with respect to change of ignition timing is.

In FIG. 22, the vertical axis represents an EGR ratio of air-fuel mixture, and the horizontal axis represents an A/F of air-fuel mixture. Sensitivity for change of timing of autoignition with respect to change of ignition timing is reduced toward the upper right portion in the drawing. Sensitivity for change of timing of autoignition is increased toward the lower left portion in the drawing. In FIG. 22, it is found that, in a range, enclosed by a broken line, in which $\lambda$ of the air-fuel mixture is 1.0±0.2 and the G/F is in a range from 18.5 to 30, timing of autoignition is changed with respect to change of ignition timing. The upper limit of the EGR ratio is preferably 40% from the viewpoint of combustion stability.

That is, when the state inside the combustion chamber 17 is set such that $\lambda$ of air-fuel mixture is 1.0±0.2 and the G/F is in a range from 18.5 to 30, SI combustion is stabilized, so that timing of autoignition can be accurately controlled in the SICI combustion.

(SICI Combustion)

Figure 5:
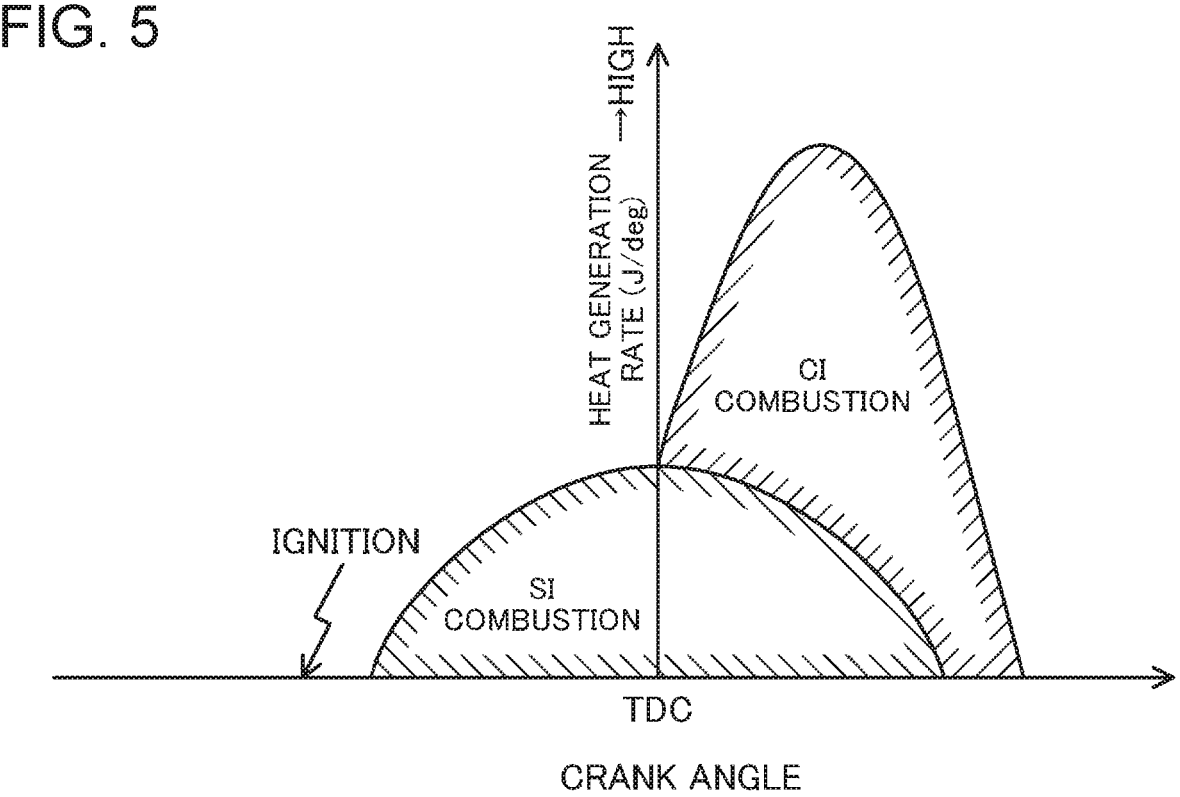
FIG. 5 conceptually illustrates change of a heat generation rate in SICI combustion in which SI combustion and CI combustion are combined.

Next, the above-described SICI combustion will be described in more detail. FIG. 5 illustrates a waveform representing an example of change of a heat generation rate with respect to a crank angle in the SICI combustion. When the spark plug 25 ignites air-fuel mixture around the compression top dead center, accurately, at predetermined timing before the compression top dead center, combustion by flame propagation starts. Heat generation at SI combustion is gentler than heat generation at CI combustion. Therefore, the waveform of the heat generation rate has a relatively small slope. A pressure variation (dp/dθ) in the combustion chamber 17 at the SI combustion is gentler than that at the CI combustion, which is not shown.

When the temperature and the pressure in the combustion chamber 17 are increased by the SI combustion, autoignition of unburned air-fuel mixture occurs. In the example of FIG. 5, the slope of the waveform of the heat generation rate changes from small to large at or near the compression top dead center. That is, the waveform of the heat generation rate has an inflection point at timing when the CI combustion starts.

After the start of the CI combustion, the SI combustion and the CI combustion are performed in parallel. In CI combustion, heat generation is greater than in the SI combustion. Therefore, the heat generation rate becomes relatively great. However, the CI combustion is performed after the compression top dead center, and the piston 3 has been moved downward due to motoring. The slope of the waveform of the heat generation rate is prevented from becoming excessively great due to the CI combustion. dp/dθ at the CI combustion becomes relatively gentle.

dp/dθ can be used as an index representing combustion noise. As described above, dp/dθ can be reduced in the SICI combustion, so that the combustion noise can be prevented from becoming excessively great. Combustion noise can be reduced to an allowable level or lower.

When the CI combustion ends, the SICI combustion ends. The combustion period of the CI combustion is shorter than that of the SI combustion. The combustion end time of the SICI combustion is advanced as compared to the SI combustion. In other words, in the SICI combustion, the combustion end time in the expansion stroke can be made close to the compression top dead center. The SICI combustion is more advantageous than the SI combustion in improvement of fuel economy performance of the engine 1.

Therefore, the SICI combustion enables both prevention of combustion noise and improvement of fuel economy performance.

An SI rate is defined as a parameter representing the characteristics of the SICI combustion. The SI rate is defined as the ratio of an amount of heat generated by the SI combustion relative to the total amount of heat generated by the SICI combustion. That is, in FIG. 5, the SI rate=(area of SI combustion)/(area of SICI combustion). The SI rate is a ratio between SI combustion and CI combustion in the SICI combustion in which the SI combustion and the CI combustion are combined. When the SI rate is high, the proportion of the SI combustion is high. When the SI rate is low, the proportion of the CI combustion is high.

The SI rate is not limited to one defined as described above. The SI rate may be variously defined. For example, the SI rate may be the ratio of an amount of heat generated by the SI combustion relative to an amount of heat generated by the CI combustion. That is, in FIG. 5, the SI rate=(area of SI combustion)/(area of CI combustion) may be defined.

Figure 6:
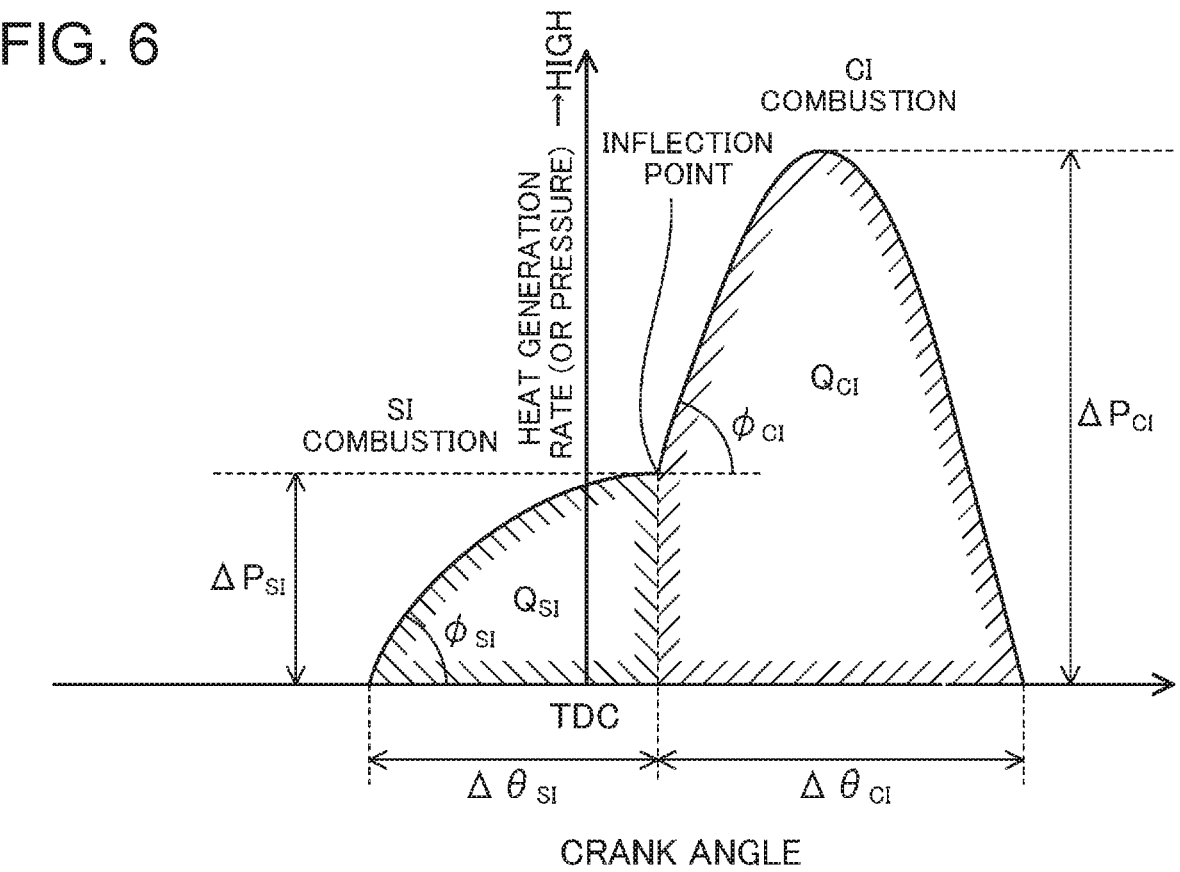
FIG. 6 illustrates definition of an SI rate in SICI combustion.

Furthermore, in the SICI combustion, a waveform of the heat generation rate has an inflection point at timing when the CI combustion starts. As shown in FIG. 6, the inflection point in the waveform of the heat generation rate is set as a boundary, and a range on the advance side relative to the boundary may be defined as the SI combustion, and a range on the retard side relative to the boundary may be defined as the CI combustion. In this case, the SI rate may be represented as SI rate=$Q_{SI}/(Q_{SI}+Q_{CI})$ or SI rate=$Q_{SI}/Q_{CI}$ based on an area $Q_{SI}$ of the range on the advance side relative to the boundary and an area $Q_{CI}$ of the range on the retard side relative to the boundary, as indicated by hatching in FIG. 6. Furthermore, the SI rate may be defined not based on the entirety but based on a part of the area of the range on the advance side relative to the boundary, and a part of the area of the range on the retard side relative to the boundary.

Furthermore, the SI rate may not be defined based on heat generation. The SI rate may be represented as SI rate=$\Delta\theta_{SI}/(\Delta\theta_{SI}+\Delta\theta_{CI})$ or SI rate=$\Delta\theta_{SI}/\Delta\theta_{CI}$ based on a crank angle $\Delta\theta_{SI}$ for the range on the advance side relative to the boundary and a crank angle $\Delta\theta_{CI}$ for the range on the retard side relative to the boundary.

Moreover, SI rate=$\Delta P_{SI}/(\Delta P_{SI}+\Delta P_{CI})$ or SI rate=$\Delta P_{SI}/\Delta P_{CI}$ may be defined based on a peak $\Delta P_{SI}$ of the heat generation rate in the range on the advance side relative to the boundary and a peak $\Delta P_{CI}$ of the heat generation rate in the range on the retard side relative to the boundary.

In addition, SI rate=$\varphi_{SI}/(\varphi_{SI}+\varphi_{CI})$ or SI rate=$\varphi_{SI}/\varphi_{CI}$ may be defined based on a slope $\varphi_{SI}$ of the heat generation rate in the range on the advance side relative to the boundary and a slope $\varphi_{CI}$ of the heat generation rate in the range on the retard side relative to the boundary.

In the description herein, the SI rate is defined, based on the waveform of the heat generation rate, from an area (that is, magnitude of an amount of generated heat), the length of the horizontal axis (that is, magnitude of crank angle), the length of the vertical axis (that is, magnitude of heat generation rate), or a slope (that is, change rate of heat generation rate). The SI rate may be defined based on a waveform of a pressure (P) in the combustion chamber 17, similarly from the area, the length of the horizontal axis, the length of the vertical axis, or the slope, which is not shown.

Figure 7:
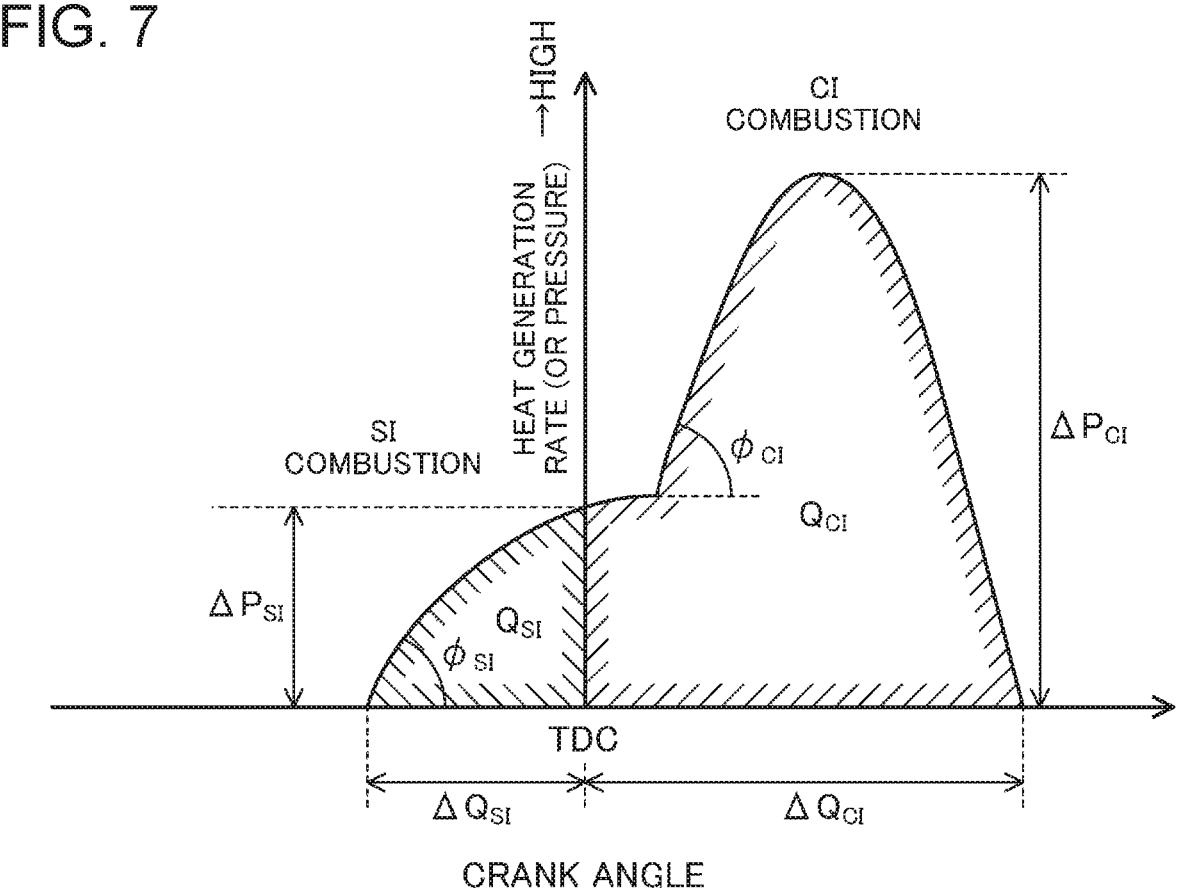
FIG. 7 illustrates definition of an SI rate in SICI combustion.

Furthermore, in the SICI combustion, the inflection point of the combustion waveform associated with the heat generation rate or pressure may not always appear clearly. The SI rate which is not based on the inflection point may be defined as follows. That is, as shown in FIG. 7, in the combustion waveform, a range on the advance side relative to the compression top dead center (TDC) may be defined as the SI combustion, and a range on the retard side relative to the compression top dead center may be defined as the CI combustion. Based thereon, similarly as described above, the SI rate may be defined from the area ($Q_{SI}$, $Q_{CI}$), the length of the horizontal axis ($\Delta\theta_{SI}$, $\Delta\theta_{CI}$), the length of the vertical axis ($\Delta P_{SI}$, $\Delta P_{CI}$), or the slope ($\varphi_{SI}$, $\varphi_{CI}$).

Furthermore, the SI rate may be defined not based on a combustion waveform actually obtained in the combustion chamber 17 but based on an amount of fuel. As described below, in the intermediate load region in which the SICI combustion is performed, divided injection that includes preceding injection and succeeding injection is performed. Fuel injected into the combustion chamber 17 in the succeeding injection does not diffuse in the combustion chamber 17 and is positioned near the spark plug 25 since a time from the injection to ignition is short. Therefore, the fuel injected into the combustion chamber 17 in the succeeding injection is combusted mainly by the SI combustion. Meanwhile, fuel injected into the combustion chamber 17 in the preceding injection is combusted mainly by CI combustion. Therefore, the SI rate can be defined based on an amount of fuel ($m_1$) injected in the preceding injection, and an amount of fuel ($m_2$) injected in the succeeding injection. That is, SI rate=$m_2/(m_1+m_2)$ may be defined or SI rate=$m_2/m_1$ may be defined.

(Fuel Injection Control)

Figure 8:
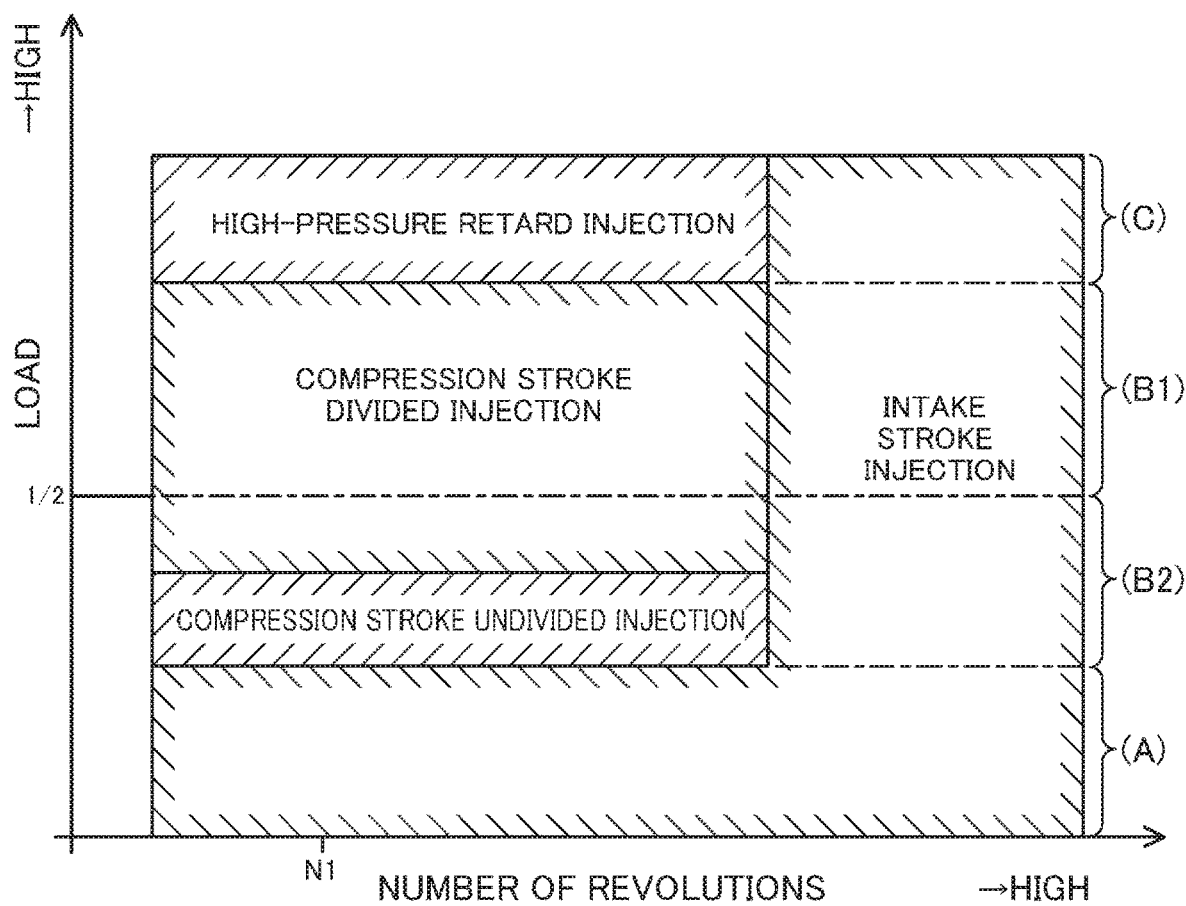
FIG. 8 illustrates a map regarding fuel injection control.

FIG. 8 illustrates a map regarding fuel injection control. The operation region of the engine 1 is divided into four regions based on fuel injection. The four regions are an intake stroke injection region, a compression stroke undivided injection region, a compression stroke divided injection region, and a high-pressure retard injection region. Fuel injection in each region will be sequentially described below.

(High-Pressure Retard Injection Region)

The high-pressure retard injection region is included in the high load region (C). Specifically, the high-pressure retard injection region corresponds to the side, at which the number of revolutions is low, in the high load region (C).

As described above, the engine 1 performs SI combustion in the high load region. However, due to the geometrical compression ratio being high or the like, a problem arises that abnormal combustion such as preignition or knocking is likely to occur.

Therefore, the engine 1 is configured to avoid the abnormal combustion by fuel injection mode being properly designed for the high-pressure retard injection region. Specifically, the ECU 10 outputs control signals to the fuel supply system 61 and the injector 6 such that fuel is injected into the combustion chamber 17 with high fuel pressure of 30 MPa or higher at timing in a period (hereinafter, the period is referred to as retard period) between the later stage of the compression stroke and the initial stage of the expansion stroke. The ECU 10 further outputs a control signal to the spark plug 25 such that the air-fuel mixture is ignited at timing at or near the compression top dead center after injection of fuel. In the below description, injection of fuel into the combustion chamber 17 with high fuel pressure at timing in the retard period is referred to as high-pressure retard injection.

In the high-pressure retard injection, a time for reaction of the air-fuel mixture is shortened to avoid abnormal combustion. That is, the time for reaction of the air-fuel mixture is a time obtained by addition of (1) a period (that is, injection period) in which the injector 6 injects fuel, (2) a period (that is, air-fuel mixture forming period) in which burnable air-fuel mixture is formed around the spark plug 25 after injection of fuel has ended, and (3) a period (that is, combustion period) up to the end of the SI combustion started by ignition.

When fuel is injected into the combustion chamber 17 with a high fuel pressure, the injection period and the air-fuel mixture forming period are each shortened. When the injection period and the air-fuel mixture forming period are shortened, timing at which injection of fuel starts can be close to ignition timing. In the high-pressure retard injection, fuel is injected into the combustion chamber 17 with a high pressure. Therefore, fuel injection is performed at timing in the retard period from the later stage of the compression stroke to the initial stage of the expansion stroke.

When fuel is injected into the combustion chamber 17 with a high fuel pressure, turbulent energy in the combustion chamber 17 becomes high. When the timing of fuel injection is made close to the compression top dead center, the SI combustion can be started in a state where the turbulent energy in the combustion chamber 17 is high. As a result, combustion period is shortened.

The high-pressure retard injection allows the injection period, the air-fuel mixture forming period, and the combustion period to be each shortened. As compared to a case where fuel is injected into the combustion chamber 17 in the intake stroke, the high-pressure retard injection allows a time for reaction of the air-fuel mixture to be greatly shortened. The high-pressure retard injection allows a time for reaction of the air-fuel mixture to be shortened, whereby abnormal combustion can be avoided.

In the technical field of the engine control, retarding of ignition timing has been conventionally performed in order to avoid abnormal combustion. However, when the ignition timing is retarded, fuel economy performance is degraded. In the high-pressure retard injection, ignition timing need not be retarded. By using the high-pressure retard injection, the fuel economy performance is improved.

When the fuel pressure is, for example, 30 MPa or higher, the injection period, the air-fuel mixture forming period, and the combustion period can be effectively shortened. The fuel pressure may be preferably set as appropriate according to the properties of fuel. The upper limit value of the fuel pressure may be, for example, 120 MPa.

(Intake Stroke Injection Region in High Load Region)

When the number of revolutions of the engine 1 is small, time for which a crank angle is changed by the same angle is long. Therefore, shortening of a time in which air-fuel mixture can react, by the high-pressure retard injection, is particularly effective for avoiding abnormal combustion. Meanwhile, when the number of revolutions of the engine 1 is great, time for which a crank angle is changed by the same angle is short. Therefore, shortening of a time in which air-fuel mixture can react is not so effective for avoiding abnormal combustion.

Furthermore, in the high-pressure retard injection, injection of fuel into the combustion chamber 17 starts around the compression top dead center. Therefore, in the compression stroke, gas which does not contain fuel, in other words, gas having a high specific heat ratio is compressed in the combustion chamber 17. In a case where the number of revolutions of the engine 1 is great, when the high-pressure retard injection is performed, the temperature in the combustion chamber 17 at the compression top dead center, that is, the compression end temperature becomes high. When the compression end temperature becomes high, abnormal combustion such as knocking may be caused.

In the engine 1, the high load region (C) is divided, as regions regarding fuel injection, into a high-pressure retard injection region on the low rotation side and an intake stroke injection region in which the number of revolutions is higher than that in the high-pressure retard injection region. When the high load region is divided into three equal regions that are a low rotation region, an intermediate rotation region, and a high rotation region, the high-pressure retard injection region may include the low rotation region and the intermediate rotation region. When the high load region is divided into the three equal regions that are the low rotation region, the intermediate rotation region, and the high rotation region, the intake stroke injection region may include the high rotation region.

In the high-pressure retard injection region, the injector 6 receives a control signal from the ECU 10 and performs the above-described high-pressure retard injection. In the intake stroke injection region, the injector 6 receives a control signal from the ECU 10 and performs fuel injection at predetermined timing in the intake stroke. The fuel injection in the intake stroke does not require a high fuel pressure. The ECU 10 outputs a control signal to the fuel supply system 61 such that the fuel pressure is lower than a fuel pressure in the high-pressure retard injection (for example, such that the fuel pressure is less than 40 MPa). By the fuel pressure being lowered, the mechanical resistance loss of the engine 1 is reduced, so that fuel economy is advantageously improved.

When fuel is injected into the combustion chamber 17 in the intake stroke, the specific heat ratio of gas in the combustion chamber 17 is reduced, whereby the compression end temperature becomes low. The compression end temperature becomes low, whereby the engine 1 is allowed to avoid abnormal combustion. The ignition timing need not be retarded in order to avoid abnormal combustion, whereby the spark plug 25 ignites air-fuel mixture at timing of or at timing near the compression top dead center in the second high load region, as in the first high load region.

In the high-pressure retard injection region, the high-pressure retard injection prevents occurrence of autoignition of the air-fuel mixture. Therefore, the engine 1 can perform stable SI combustion. In the intake stroke injection region, the fuel injection in the intake stroke prevents occurrence of autoignition of the air-fuel mixture. Therefore, the engine 1 can perform stable SI combustion.

(Compression Stroke Divided Injection Region)

The compression stroke divided injection region is included in the intermediate load region (B). Specifically, the compression stroke divided injection region includes: a region, on the side at which the number of revolutions is low, in the first intermediate load region (B1); and a region, on the side at which the number of revolutions is low and the load is high, in the second intermediate load region (B2). The first intermediate load region (B1) is divided into two regions, that is, a compression stroke divided injection region and an intake stroke injection region, based on fuel injection.

In the intermediate load region (B), the engine 1 performs SICI combustion. In the SICI combustion, if the temperature in the combustion chamber 17 is increased, start of CI combustion is advanced. If start of the CI combustion is advanced, combustion noise is increased. Thus, as described in detail later, in the intermediate load region (B), the engine 1 introduces cooled external EGR gas into the combustion chamber 17. Accordingly, the temperature in the combustion chamber 17 before start of compression is decreased, so that the CI combustion is inhibited from being advanced.

Meanwhile, in the SICI combustion, when the combustion speed in SI combustion is higher, controllability of the CI combustion by the SI combustion is enhanced. When the temperature in the combustion chamber 17 before start of compression is lower, the combustion stability of the SI combustion is decreased.

Therefore, in the engine 1, in a part of the intermediate load region (B), the temperature in a region, in which air-fuel mixture for the CI combustion is formed, in the combustion chamber 17 is locally decreased by using the latent heat of vaporization of fuel injected into the combustion chamber 17, whereby start of the CI combustion is prevented from being advanced, while the combustion speed in the SI combustion is increased.

Specifically, in the compression stroke divided injection region, the ECU 10 outputs a control signal to the injector 6 such that two fuel injections, that is, preceding injection and succeeding injection, are performed in the compression stroke. The preceding injection and the succeeding injection are performed in the latter half period in the compression stroke. The latter half period in the compression stroke corresponds to a latter half period obtained when the compression stroke is divided into two equal periods. In the preceding injection, fuel is injected at timing that is not close to the ignition timing. In the succeeding injection, fuel is injected at timing close to the ignition timing. The fuel injected in the preceding injection is away from the spark plug 25 and thus forms air-fuel mixture that is to be mainly subjected to CI combustion. The fuel injected in the succeeding injection is close to the spark plug 25 and thus forms air-fuel mixture that is to be mainly subjected to SI combustion. Since the preceding injection is performed in the compression stroke, abnormal combustion such as preignition can be prevented from being caused by the fuel injected in the preceding injection. In addition, the fuel injected in the succeeding injection can be stably combusted by flame propagation.

Figure 9:
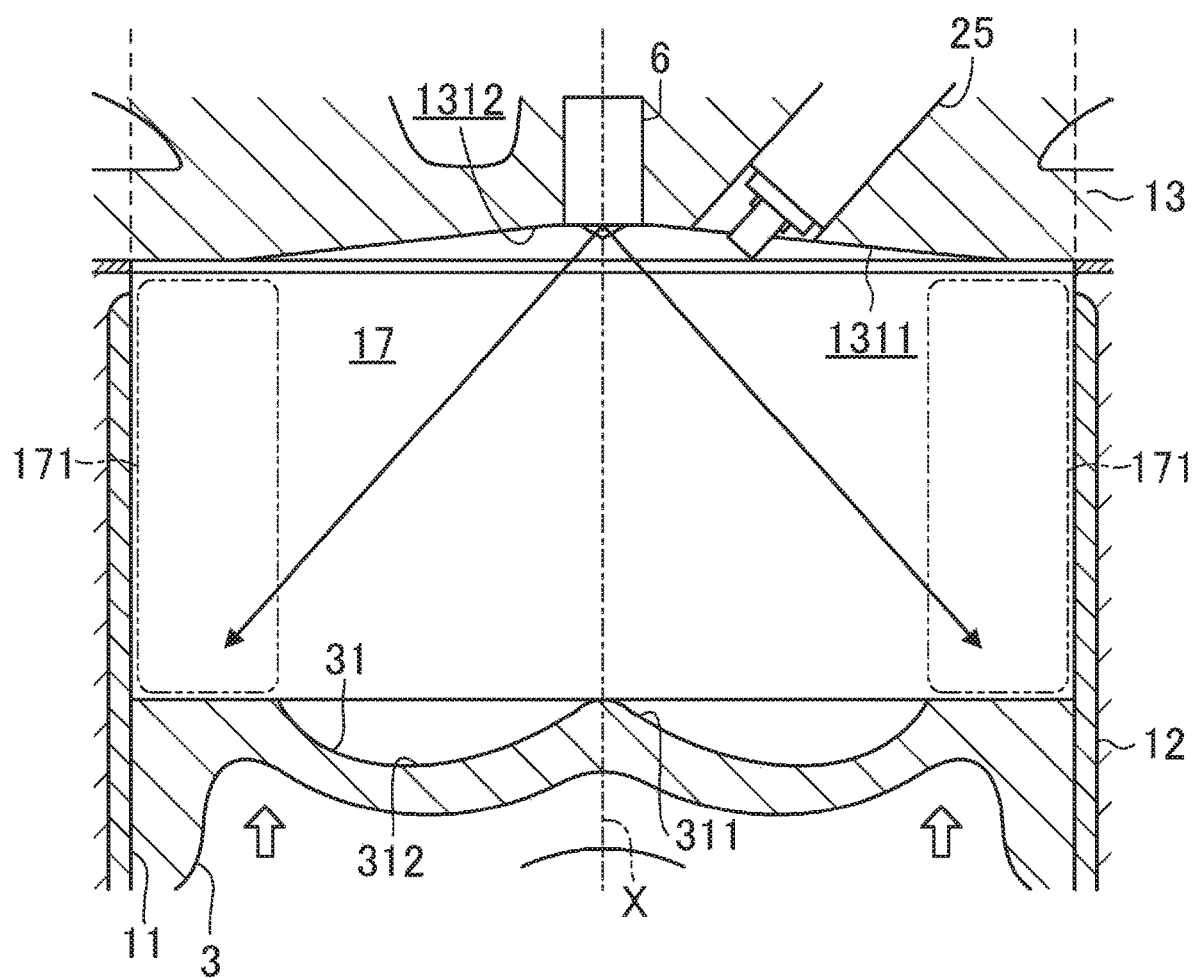
FIG. 9 is a cross-sectional view illustrating a state of a combustion chamber at timing of preceding injection in a compression stroke divided injection region.
Figure 10:
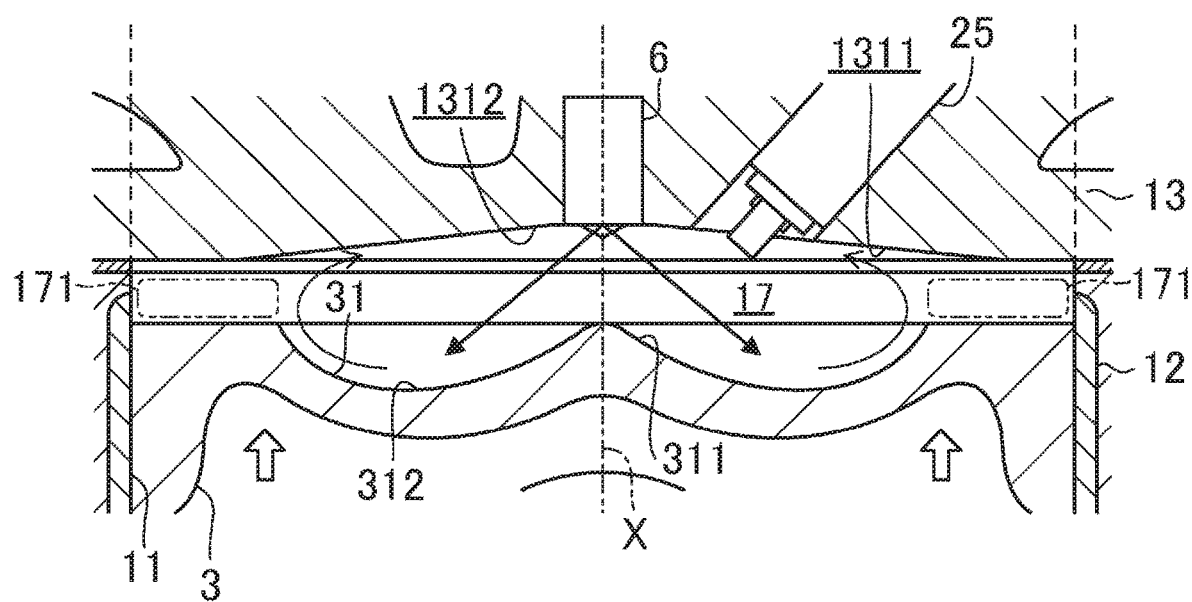
FIG. 10 is a cross-sectional view illustrating a state of the combustion chamber at timing of succeeding injection in the compression stroke divided injection region.

The preceding injection may be started, for example, at timing of 80±5° C.A (Crank Angle) before the top dead center. As described above, the injector 6 has a plurality of holes each having a hole axis inclined relative to the central axis (that is, cylinder axis) X of the cylinder 11, and radially injects fuel from the center portion of the combustion chamber 17 toward the radially outer side. When the injector 6 injects fuel from the center portion of the combustion chamber 17 toward the radially outer side at the timing of 80±5° C.A before the top dead center, since the piston 3 is distant from the top dead center, the injected fuel spray reaches the outside of the cavity 31 on the upper surface of the piston 3 that is moving upward toward the top dead center, as indicated by arrows in the FIG. 9. The region outside the cavity 31 forms a squish area 171 as indicated by alternate long and short dash lines in FIG. 9 and FIG. 10. While the piston 3 is moving upward, the fuel injected in the preceding injection is accumulated in the squish area 171 and forms air-fuel mixture in the squish area 171. The air-fuel mixture is combusted mainly by the CI combustion. The squish area 171 can be considered as a region in which air-fuel mixture is subjected to CI combustion, and the preceding injection can be considered as injection in which fuel is injected into the region in which air-fuel mixture is subjected to CI combustion. In addition, in the squish area 171, the temperature is locally decreased by the latent heat of vaporization of the fuel injected into the squish area 171 in the preceding injection.

The succeeding injection may be started, for example, at timing of 45±5° CA before the top dead center. When the injector 6 injects fuel at this timing, since the piston 3 is close to the top dead center, the injected fuel spray enters the cavity 31 as indicated by arrows in FIG. 10. As described above, when the injector 6 injects fuel, fuel spray flows downward along the projection 311 of the cavity 31 while mixing with fresh air, and flows so as to spread radially from the center of the combustion chamber 17 along the bottom surface and the circumferential side surface of the depressed portion 312 in the radially outward direction. Thereafter, air-fuel mixture reaches the opening of the cavity 31, and flows from the radially outer side, along the inclined surface 1311 on the intake side and the inclined surface 1312 on the exhaust side, toward the center of the combustion chamber 17. In this manner, the fuel injected in the succeeding injection forms air-fuel mixture in a region inside the cavity 31. The "region inside the cavity 31" may refer to a region obtained by combining the region within the cavity 31 and the region up to the opening of the cavity 31 from a projection surface obtained by projecting the opening of the cavity 31 onto the roof of the combustion chamber 17. The region inside the cavity 31 can be considered as a region, other than the squish area 171, in the combustion chamber 17.

Gas flows in the region inside the cavity 31 according to fuel being injected into the cavity 31 in the succeeding injection. The turbulent energy in the combustion chamber 17 is attenuated according to progress of the compression stroke when a time up to the ignition timing is long. However, the injection timing in the succeeding injection is closer to the ignition timing than the injection timing in the preceding injection. Therefore, the spark plug 25 can ignite air-fuel mixture in the region inside the cavity 31 in a state where the turbulent energy in the cavity 31 remains high. Thus, a combustion speed in the SI combustion is increased. When the combustion speed in the SI combustion is increased, controllability of the CI combustion by the SI combustion is enhanced as described above.

The region inside the cavity 31 can be considered as a region in which air-fuel mixture is subjected to SI combustion, and the succeeding injection can be considered as injection in which fuel is injected into the region in which air-fuel mixture is subjected to SI combustion.

When the temperature in the combustion chamber 17 is increased by the SI combustion, the air-fuel mixture in the squish area 171 is combusted by autoignition. Since the temperature is locally decreased in the squish area 171 by the latent heat of vaporization of fuel as described above, start of the CI combustion can be prevented from being advanced.

The compression stroke divided injection region corresponds to a region in which the load on the engine 1 is relatively high. The total injection amount of fuel to be injected into the combustion chamber 17 is large. Therefore, the injection amount per one injection is increased, and the penetration of fuel spray is strong. The spray of fuel injected in the preceding injection assuredly reaches the squish area 171. In addition, the turbulent energy in the region inside the cavity 31 can be sufficiently increased by the succeeding injection. Furthermore, in each of the preceding injection and the succeeding injection, in the regions inside and outside the cavity 31, fuel spray and fresh air are sufficiently mixed together, so that the homogeneity of air-fuel mixture is increased.

The pressure of fuel in the compression stroke divided injection region is preferably set so as to be relatively high. For example, the pressure of fuel may be made higher than that when fuel is injected in the intake stroke. Accordingly, fuel spray can be made to reach the squish area 171 against the high pressure in the combustion chamber 17 in the compression stroke. In the compression stroke divided injection region, a fuel pressure that is as high as required for high-pressure retard injection is not required, and thus the ECU 10 may set the pressure of fuel to a pressure lower than that at the time of high-pressure retard injection. When the pressure of fuel is set so as to be low, fuel economy can be improved.

Figure 11:
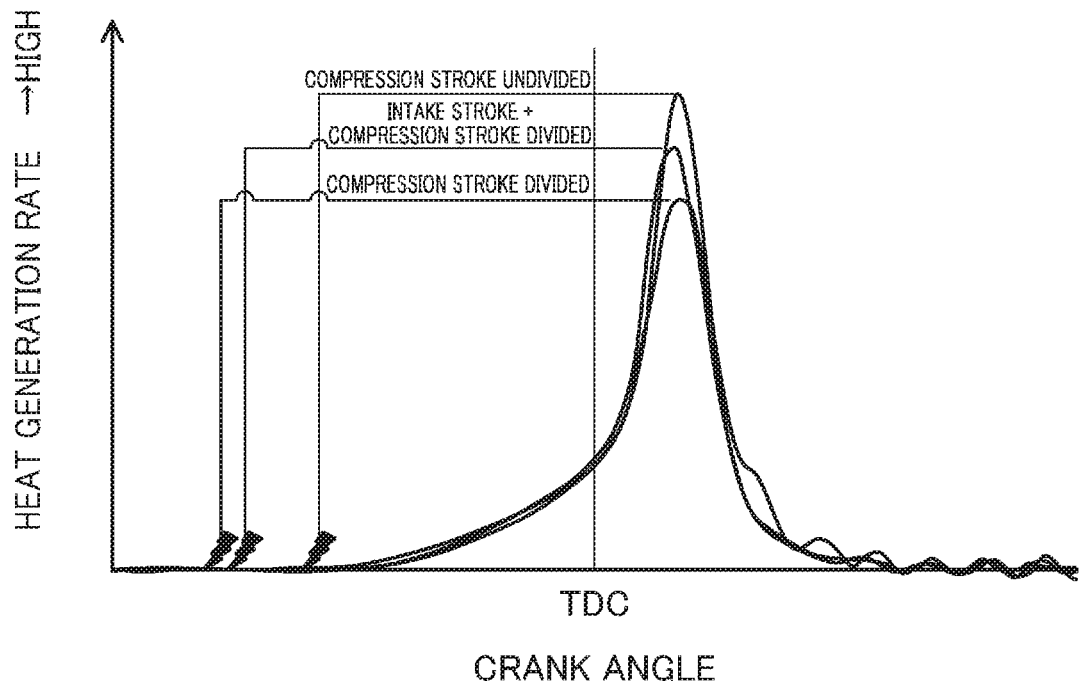
FIG. 11 illustrates differences in combustion waveform produced when an injection mode is changed.

In FIG. 11, differences in combustion waveform produced when the fuel injection mode is changed in the intermediate load region (B) are compared. Here, in the compression stroke, a first injection mode in which undivided injection is started at timing of 45° CA before the top dead center in the compression stroke, a second injection mode in which preceding injection is started at timing (320° CA before the top dead center) in the intake stroke and succeeding injection is started at timing (45° CA before top dead center) in the compression stroke, and a third injection mode in which preceding injection is started at timing of 80° CA before the top dead center in the compression stroke and succeeding injection is started at timing of 45° CA before the top dead center, are compared. In each of the second injection mode and the third injection mode, an injection amount division ratio between the preceding injection and the succeeding injection (preceding injection amount:succeeding injection amount) is 2:8. In addition, in each of the first injection mode, the second injection mode, and the third injection mode, ignition timing is adjusted such that start times of the CI combustion almost coincide.

When fuel is injected at once in the compression stroke, start of the CI combustion is excessively advanced. In FIG. 11, start of the SI combustion is delayed by delaying ignition timing, thereby attempting to delay start of the CI combustion. However, the CI combustion cannot be controlled, so that the maximum value of the heat generation rate is increased. In the first injection mode, combustion noise cannot be inhibited.

When fuel is injected in each of the intake stroke and the compression stroke, the fuel injected in the preceding injection widely diffuses in the combustion chamber 17 and is exposed in a high-temperature environment for a long period of time. Thus, the combustion speed in the SI combustion is increased, but the CI combustion cannot be controlled. Accordingly, as shown in FIG. 11, the slope of the heat generation rate obtained when the CI combustion starts is increased, and the maximum value of the heat generation rate is also increased. In the second injection mode as well, combustion noise cannot be inhibited.

When divided injection of fuel is performed in the compression stroke, the fuel injected in the preceding injection decreases the temperature in the squish area 171 by the latent heat of vaporization thereof as described above. As a result, start of the CI combustion can be prevented from being advanced.

In addition, the fuel injected in the succeeding injection increases the turbulent energy in the region inside the cavity 31 as described above. As a result, the combustion speed in the SI combustion is increased, so that controllability of the CI combustion is enhanced.

The latent heat of vaporization of the fuel injected in the preceding injection locally decreases the temperature in the squish area 171, and thus hardly influences the temperature in the cavity 31.

In the third injection mode, since the CI combustion is prevented from being advanced, ignition timing is advanced as shown in FIG. 11. Accordingly, the SI rate in the SICI combustion becomes relatively high, so that the slope of the heat generation rate obtained when the CI combustion starts does not become large and the maximum value of the heat generation rate is also decreased. In the third injection mode, combustion noise can be prevented from being increased.

Figure 12:
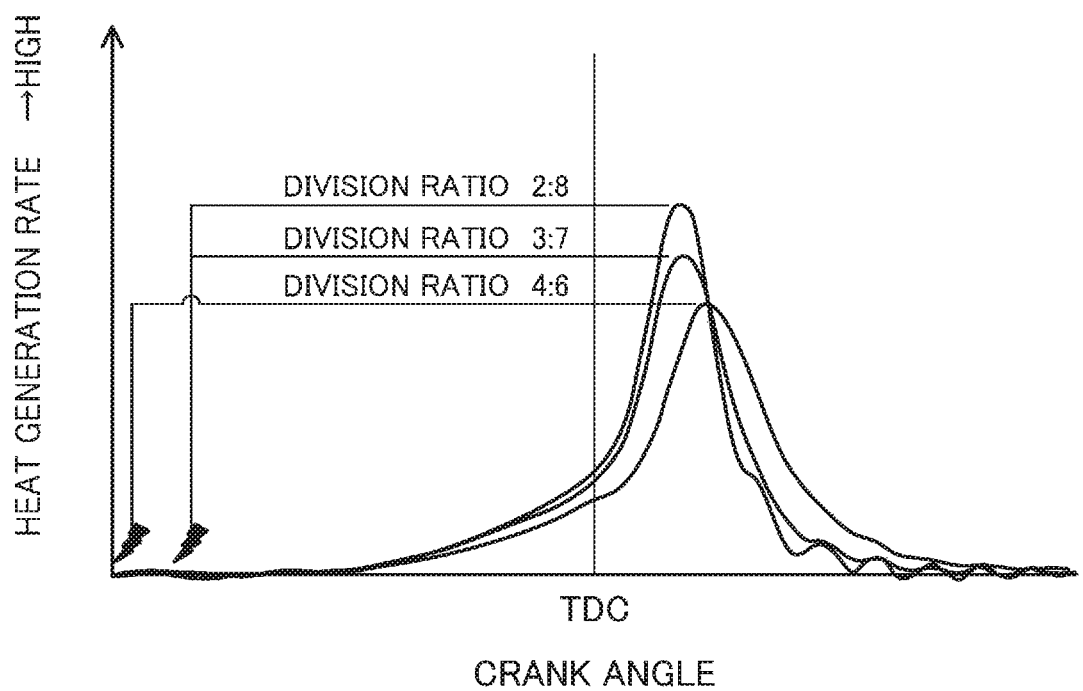
FIG. 12 illustrates differences in combustion waveform produced when a ratio of injection amounts in divided injection is changed.

In FIG. 12, differences in combustion waveform produced when the injection amount division ratio between the preceding injection and the succeeding injection in divided injection in the compression stroke is changed are compared. Regarding the injection ratio between the preceding injection and the succeeding injection, a first injection ratio that is 2:8, a second injection ratio that is 3:7, and a third injection ratio that is 4:6 are compared. At each of the first injection ratio, the second injection ratio, and the third injection ratio, start timing of the preceding injection is 80° CA before the top dead center, and start timing of the succeeding injection is 45° CA before the top dead center. In addition, at each of the first injection ratio, the second injection ratio, and the third injection ratio, ignition timing is changed. At both the first injection ratio and the second injection ratio, the injection amount in the succeeding injection is large, and thus ignition timing is the advance limit.

As shown in FIG. 12, as the injection amount in the preceding injection is increased, the amount of latent heat of vaporization of fuel is increased, and thus an amount, by which the temperature in the squish area 171 is decreased, is increased. Therefore, start time of the CI combustion can be delayed as the injection amount in the preceding injection is increased.

The amount of fuel is increased as the load on the engine 1 is increased. Thus, by the amount of heat generated being increased, the temperature in the combustion chamber 17 is increased. In the compression stroke divided injection region, when the injection proportion of the preceding injection is increased as the load on the engine 1 is increased, the temperature in the squish area 171 is greatly decreased. Thus, even when the load on the engine 1 is increased, the CI combustion can be started at desired timing.

As described in detail later, in the engine 1, the temperature in the combustion chamber 17 before start of compression is adjusted by adjusting a state quantity to be introduced into the combustion chamber 17, whereby the SI rate in the SICI combustion is adjusted. In addition, in the engine 1, in the above-described divided injection in the compression stroke, the temperature in the combustion chamber 17 is locally adjusted by adjusting the injection amount division ratio between the preceding injection and the succeeding injection according to the magnitude of the load on the engine 1, whereby the SI rate in the SICI combustion is adjusted.

The compression stroke divided injection region corresponds to a region, in which the number of revolutions is low, in the first intermediate load region (B1). When the number of revolutions of the engine 1 is low, flow of gas in the combustion chamber 17 is weakened. Thus, as described above, enhancing flow of gas in the combustion chamber 17 by fuel injection in the compression stroke is advantageous for improvement of the homogeneity of air-fuel mixture and improvement of the combustion speed in the SI combustion.

(Compression Stroke Undivided Injection Region)

The compression stroke undivided injection region is included in the second intermediate load region (B2). Specifically, the compression stroke undivided injection region is a region, on the low load side and on the side at which the number of revolutions is low, in the second intermediate load region (B2). The second intermediate load region (B2) is divided into three regions, that is, a compression stroke divided injection region, a compression stroke undivided injection region, and an intake stroke injection region, based on fuel injection.

In the second intermediate load region (B2), the engine 1 performs SICI combustion. In the compression stroke undivided injection region, the load on the engine 1 is relatively low, and thus an amount of fuel to be injected into the combustion chamber 17 is smaller than the injection amount in the compression stroke divided injection region. Thus, when fuel is injected in two parts in preceding injection and succeeding injection, the amount of fuel to be injected per one injection is excessively decreased, so that the penetration of fuel spray becomes weak. When the penetration of the fuel spray becomes weak, the homogeneity of air-fuel mixture is decreased, which is disadvantageous for fuel economy and exhaust gas performance. In addition, as described above, the fuel spray cannot be assuredly made to reach the inside of the squish area 171. Furthermore, the turbulent energy is decreased, so that the combustion speed in the SI combustion is decreased and controllability of the CI combustion is also decreased.

Figure 13:
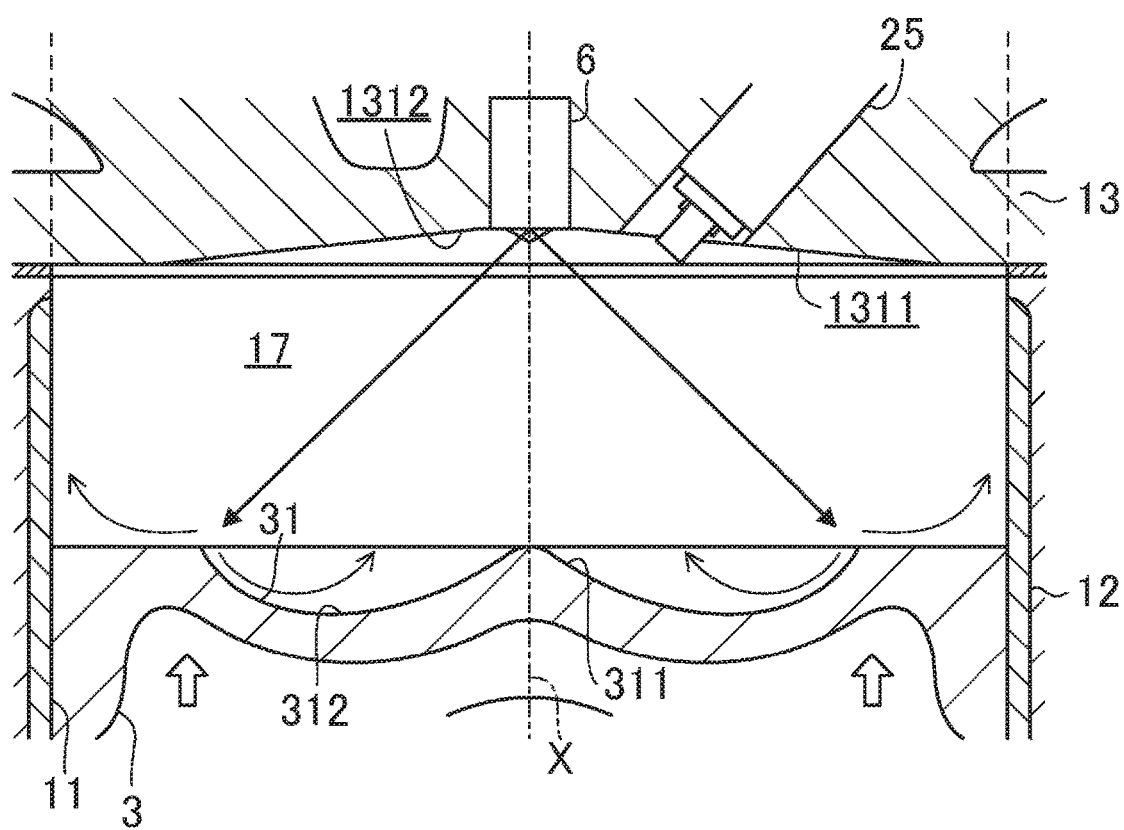
FIG. 13 is a cross-sectional view illustrating a state of the combustion chamber at timing at which fuel is injected in a compression stroke undivided injection region.

Therefore, in the engine 1, in the compression stroke undivided injection region, fuel is injected at once at predetermined timing in the compression stroke. The predetermined timing is specific timing at which a line obtained by extending the axis of each hole of the injector 6 overlaps with a specific portion including the opening edge of the cavity 31 in the upper surface of the piston 3, as shown in FIG. 13. Specifically, the injector 6 starts fuel injection at timing of 70±5° CA before the compression top dead center. When fuel injection is started at this timing, the fuel spray injected by the injector 6 collides against the opening edge of the cavity 31 and a portion near the opening edge of the cavity 31 in the upper surface of the piston 3, a part of the spray flows toward the outside of the cavity 31, and a part of the spray flows toward the inside of the cavity 31, as indicated by arrows in FIG. 13.

The fuel spray flowing to the outside of the cavity 31 flows so as to roll up, and mixes with fresh air in the region outside the cavity 31 (that is, the squish area 171) to form homogeneous air-fuel mixture while the piston 3 is moving toward the top dead center. In addition, the fuel spray flowing to the inside of the cavity 31 also forms homogeneous air-fuel mixture in the region inside the cavity 31 while the piston 3 is moving toward the top dead center. Moreover, the turbulent energy in the region inside the cavity 31 is increased by flow of gas caused by injecting fuel.

When the spark plug 25 performs ignition, the air-fuel mixture in the region inside the cavity 31 is ignited to cause SI combustion. Since the turbulent energy is high, the combustion speed in the SI combustion is increased. When the combustion speed in the SI combustion is increased, controllability of the CI combustion by the SI combustion is enhanced as described above.

When the temperature in the combustion chamber 17 is increased by the SI combustion, unburned air-fuel mixture is combusted by autoignition. Since the homogeneity of the air-fuel mixture is high in each of the regions inside and outside the cavity 31, an increase in unburned fuel and a decrease in exhaust gas performance can be prevented.

Figure 14:
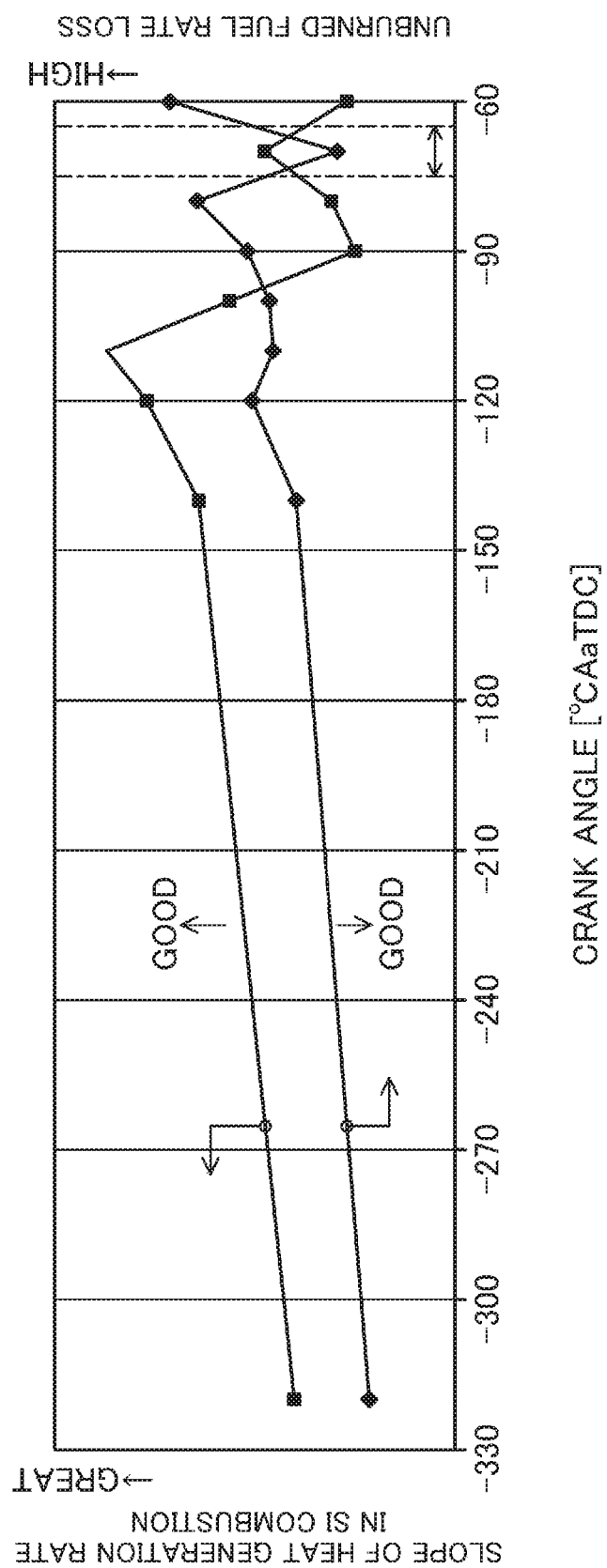
FIG. 14 illustrates change of the slope of a heat generation rate in SI combustion and change of unburned fuel rate lost in SI combustion with respect to change of fuel injection timing.

FIG. 14 illustrates change of the slope of the heat generation rate in the SI combustion and change of unburned fuel rate loss when fuel injection timing is changed in the compression stroke undivided injection region. The slope of the heat generation rate in the SI combustion is associated with the combustion speed in the SI combustion, and as the slope is increased, the combustion speed in the SI combustion is increased, which is advantageous for stabilization of the SICI combustion. Meanwhile, the unburned fuel rate loss is associated with the homogeneity of air-fuel mixture, and lower unburned fuel rate loss is advantageous for improvement of fuel economy and exhaust gas performance.

When fuel injection timing is advanced (toward the left side in FIG. 14), the slope of the heat generation rate in the SI combustion is decreased, so that the combustion speed in the SI combustion is decreased. Meanwhile, when fuel injection timing is advanced, the homogeneity of air-fuel mixture is increased, so that the unburned fuel rate loss is decreased. On the other hand, when fuel injection timing is retarded (toward the right side in FIG. 14), flow of gas, in the combustion chamber at ignition timing, caused by fuel injection becomes strong, so that the slope of the heat generation rate in the SI combustion is increased and the combustion speed in the SI combustion is increased. Meanwhile, when fuel injection timing is retarded, the homogeneity of air-fuel mixture is decreased, so that the unburned fuel rate loss is increased. Increasing the combustion speed in the SI combustion and increasing the homogeneity of air-fuel mixture are conflicting requirements.

The inventors of the present invention have found that, as indicated by arrows in FIG. 14, when fuel injection start is set to 70±5° CA before the top dead center, the combustion speed in the SI combustion is increased, but the unburned fuel rate loss is decreased. In the combustion chamber 17, the fuel spray injected by the injector 6 is considered to collide against the opening edge of the cavity 31 of the piston 3 and the portion near the opening edge of the cavity 31, thereby forming homogeneous air-fuel mixture in each of the regions inside and outside the cavity 31, as described above. The combustion speed in the SI combustion is increased by high turbulent energy in the cavity 31, and fuel economy and exhaust gas performance are improved by forming homogeneous air-fuel mixture.

The compression stroke undivided injection region corresponds to a region, in which the number of revolutions is low, in the second intermediate load region (B2). When the number of revolutions of the engine 1 is low, flow of gas in the combustion chamber 17 is weakened. Thus, as described above, enhancing flow of gas in the combustion chamber 17 by fuel injection in the compression stroke is advantageous for improvement of the homogeneity of air-fuel mixture and improvement of the combustion speed in the SI combustion.

(Intake Stroke Injection Region in Intermediate Load Region)

The high rotation side in the intermediate load region (B) is an intake stroke injection region. When the intermediate load region is divided into three equal regions that are a low rotation region, an intermediate rotation region, and a high rotation region, the intake stroke injection region may include the high rotation region. In addition, when the intermediate load region is divided into three equal regions that are a low rotation region, an intermediate rotation region, and a high rotation region, the compression stroke divided injection region and the compression stroke undivided injection region may each include the low rotation region and the intermediate rotation region.

When the number of revolutions of the engine 1 is high, flow of gas in the combustion chamber 17 is strong. In addition, when the number of revolutions of the engine 1 is increased, the time for which the crank angle is changed by the same angle is shorter. Thus, ignition timing comes before the fuel injected toward the inside of the cavity 31 in the succeeding injection reaches the vicinity of the spark plug 25. In addition, when the number of revolutions of the engine 1 is increased, start of the CI combustion is inhibited from being advanced in the SICI combustion.

Therefore, in the intermediate load region (B), when the number of revolutions of the engine 1 is high, fuel injection is performed in the intake stroke. Accordingly, the homogeneity of air-fuel mixture is enhanced, which is advantageous for improvement of fuel economy and improvement of exhaust gas performance, and also combustion noise can be inhibited.

(Intake Stroke Injection Region in Low Load Region)

As described above, in the low load region (A), the engine 1 performs SI combustion. The entirety of the low load region (A) in the number-of-revolution direction and in the load direction is an intake stroke injection region. The injector 6 injects fuel in the intake stroke. The injector 6 may inject fuel at once or may inject fuel in parts. The fuel injected into the combustion chamber 17 in the intake stroke is diffused by intake air introduced into the combustion chamber 17. The homogeneity of air-fuel mixture is enhanced. As a result, unburned fuel loss is reduced, so that fuel economy of the engine 1 is improved. In addition, generation of smoke is avoided, so that exhaust gas performance is improved.

(Operation Control of Engine)

As described above, the engine 1 switches between the SI combustion and the SICI combustion according to the operation state. The engine 1 also changes the SI rate according to the operation state of the engine 1. Since the operation region in which combustion by autoignition is performed is expanded, the engine 1 achieves both inhibition of generation of combustion noise and improvement of fuel economy.

Figure 15:
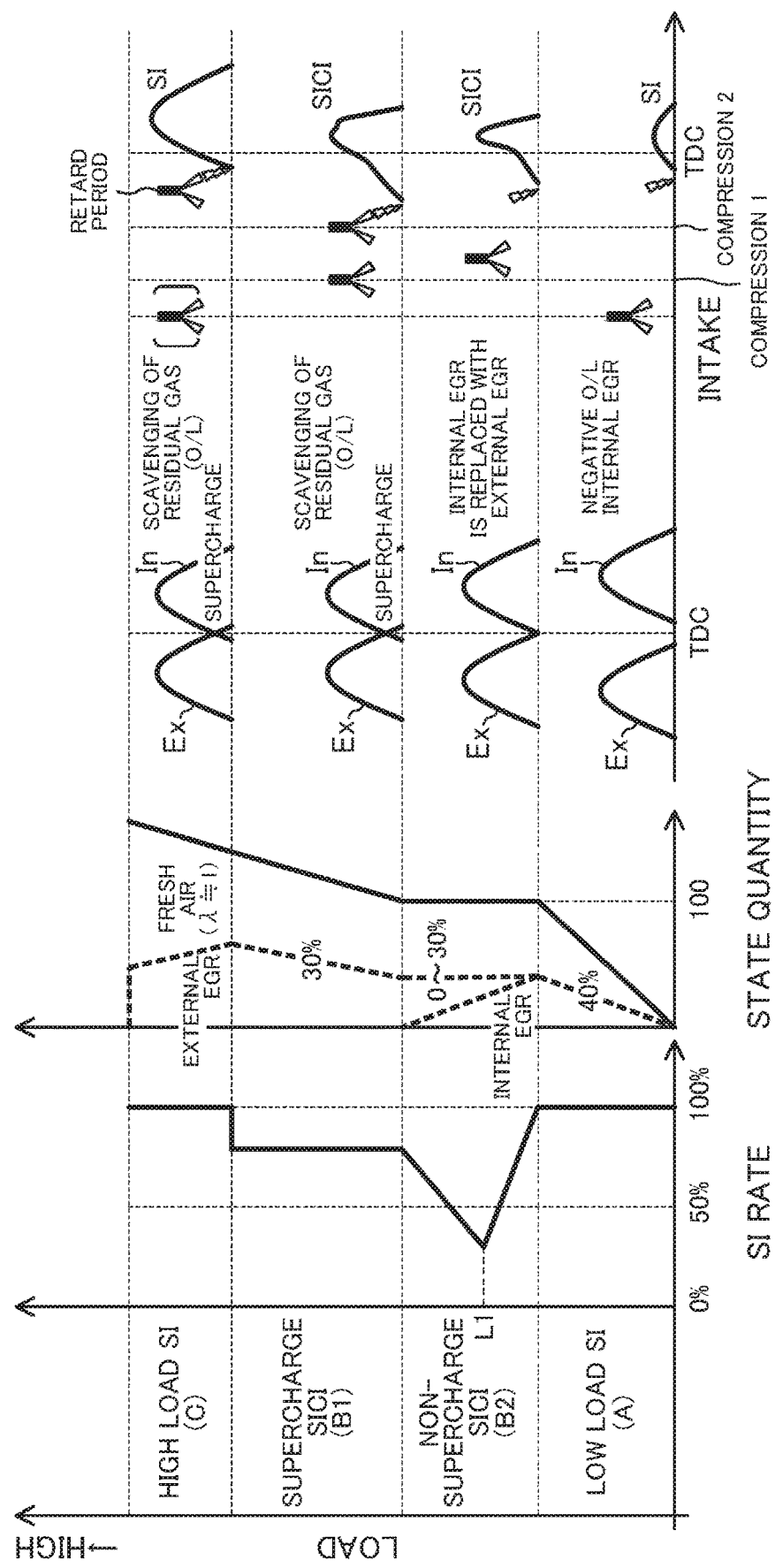
FIG. 15 illustrates change of an SI rate, change of a state quantity in the combustion chamber, change of an overlap period of an intake valve and an exhaust valve, and change of fuel injection timing and ignition timing, according to whether load on the engine is high or low.

FIG. 15 illustrates change of the SI rate, change of a state quantity in the combustion chamber 17, change of an opening period of the intake valve and an opening period of the exhaust valve, and change of fuel injection timing and ignition timing, according to whether the load on the engine 1 is high or low. Hereinafter, operation control of the engine 1 will be described on the assumption that the load on the engine 1 is gradually increased at a predetermined number of revolutions (N1 in FIG. 8).

(Low Load Region (Low Load SI Combustion))

In the low load region (A), the engine 1 performs low load SI combustion. When the operation state of the engine 1 is in the low load region, the SI rate is constantly 100%.

In the low load region, as described above, the G/F of air-fuel mixture is made constant between 18.5 and 30. In the engine 1, fresh air and burned gas are introduced, in amounts corresponding to an amount of fuel, into the combustion chamber 17. An amount of fresh air to be introduced is adjusted by throttling and/or Miller cycle as described above. Since a dilution rate is high, the temperature in the combustion chamber 17 is increased in order to stabilize SI combustion. In the engine 1 in the low load region, internal EGR gas is introduced into the combustion chamber 17.

The internal EGR gas is introduced into the combustion chamber 17 (that is, burned gas is confined in the combustion chamber 17) by setting a negative overlap period in which the intake valve 21 and the exhaust valve 22 are both closed around the exhaust top dead center. The length of the negative overlap period is set as appropriate by an opening time of the intake valve 21 being adjusted by the intake electric VVT 23, and an opening time of the exhaust valve 22 being adjusted by the exhaust electric VVT 24, whereby an amount of the internal EGR gas is adjusted.

In the low load region, an amount for filling the combustion chamber 17 is adjusted to be less than 100%. As an amount of fuel is increased, an amount of fresh air and an amount of the internal EGR gas which are to be introduced into the combustion chamber 17 are gradually increased. The EGR ratio in the low load region (that is, the mass ratio of the EGR gas relative to the total gas in the combustion chamber 17) is, for example, 40%.

As described above, the injector 6 injects fuel into the combustion chamber 17 in the intake stroke. In the combustion chamber 17, homogeneous air-fuel mixture having an excess air ratio λ of 1.0±0.2 and a G/F of 18.5 to 30 is formed. The excess air ratio λ is preferably 1.0 to 1.2. At predetermined timing before the compression top dead center, the spark plug 25 ignites the air-fuel mixture, whereby the air-fuel mixture is combusted by flame propagation without causing autoignition.

(Second Intermediate Load Region (Non-Supercharge SICI Combustion))

When load on the engine 1 becomes high and the operation state enters the second intermediate load region (B2), the engine 1 switches from the low load SI combustion to non-supercharge SICI combustion. The SI rate is less than 100%. An amount of fuel is increased according to load on the engine 1 being increased. In the second intermediate load region, when the load is low, the proportion of CI combustion is increased according to an amount of fuel being increased. The SI rate is gradually reduced according to load on the engine 1 being increased. The SI rate is reduced to a predetermined value (lowest value) that is 50% or less, in the example shown in FIG. 8.

Since an amount of fuel is increased, a temperature of combustion becomes high in the second intermediate load region. When the temperature in the combustion chamber 17 is excessively high, heat generation at the start of CI combustion is intense. In this case, combustion noise is increased.

Therefore, in the second intermediate load region, a ratio between the internal EGR gas and the external EGR gas is changed with respect to change of load on the engine 1 in order to adjust a temperature in the combustion chamber 17 before start of compression. That is, according to load on the engine 1 being increased, hot internal EGR gas is gradually reduced, and cooled external EGR gas is gradually increased. The negative overlap period is changed from the maximum to zero as the load is increased in the second intermediate load region. The internal EGR gas becomes zero when the load is highest in the second intermediate load region.

An opening degree of the EGR valve 54 is changed in the second intermediate load region such that the external EGR gas is increased as the load is increased. An amount of the external EGR gas to be introduced into the combustion chamber 17 is adjusted so as to be, for example, 0 to 30% when represented as the EGR ratio. In the second intermediate load region, the EGR gas is replaced such that the internal EGR gas is replaced with the external EGR gas according to load on the engine 1 being increased.

An amount of EGR gas to be introduced into the combustion chamber 17 is sequential between the low load region and the second intermediate load region. In a region, of the second intermediate load region, in which load is low, similarly to the low load region, a large amount of internal EGR gas is introduced into the combustion chamber 17. Since the temperature in the combustion chamber 17 becomes high, when load on the engine 1 is low, autoignition of air-fuel mixture assuredly occurs. In a region, of the second intermediate load region, in which load is high, external EGR gas is introduced into the combustion chamber 17. Since the temperature in the combustion chamber 17 becomes low, when load on the engine 1 is high, combustion noise caused by CI combustion can be reduced.

In the second intermediate load region, an amount for filling the combustion chamber 17 is 100%. The opening degree of the throttle valve 43 is a fully opened degree. An amount of EGR gas which is the sum of internal EGR gas and external EGR gas is adjusted, whereby an amount of fresh air to be introduced into the combustion chamber 17 is adjusted so as to correspond to an amount of fuel.

In non-supercharge SICI combustion, as the proportion of the CI combustion is increased, timing of autoignition is advanced. If the timing of autoignition is earlier than the compression top dead center, heat generation at the start of CI combustion is intense. In this case, combustion noise is increased. Therefore, when load on the engine 1 reaches a predetermined load L1, the engine 1 gradually increases the SI rate according to load on the engine 1 being increased.

That is, as an amount of fuel is increased, the engine 1 increases the proportion of SI combustion. Specifically, as shown in the upper diagram of FIG. 16, in non-supercharge SICI combustion, as an amount of fuel is increased, ignition timing is gradually advanced. As described above, an amount of internal EGR gas to be introduced is reduced and an amount of external EGR gas to be introduced is increased, whereby the temperature in the combustion chamber 17 is adjusted. Therefore, even if the SI rate is increased according to an amount of fuel being increased, an increase in temperature at the compression top dead center can be inhibited. Change of the slope of the heat generation rate in the SI combustion is little even if load is increased. When the ignition timing is advanced, an amount of heat generated by the SI combustion is increased according to start of the SI combustion becoming earlier.

As a result of an increase in temperature in the combustion chamber 17 by the SI combustion being inhibited, autoignition of unburned air-fuel mixture occurs at timing at or after the compression top dead center. Since an amount of heat generated by the SI combustion is increased, heat generation in the CI combustion is almost the same even if load on the engine 1 is increased. Therefore, the SI rate is set to be gradually increased according to load on the engine 1 being increased, whereby increase of combustion noise can be avoided. The higher load is, the more greatly the center of gravity of combustion in non-supercharge SICI combustion is retarded.

In the second intermediate load region, as described above, when the load on the engine 1 is low, the injector 6 injects fuel at once in the compression stroke. In addition, when the load on the engine 1 is high, the injector 6 injects fuel into the combustion chamber 17 in two parts as preceding injection and succeeding injection in the compression stroke. When divided injection is performed, the ECU 10 changes the injection ratio between the preceding injection and the succeeding injection according to the load on the engine 1.

In the combustion chamber 17, almost homogeneous air-fuel mixture having an excess air ratio $\lambda$ of 1.0±0.2 and a G/F of 18.5 to 30 is formed. Since the air-fuel mixture is almost homogeneous, improvement of fuel economy by reduction of unburned fuel loss, and improvement of exhaust gas performance by avoiding generation of smoke, can be achieved. The excess air ratio $\lambda$ is preferably 1.0 to 1.2.

At predetermined timing before the compression top dead center, the spark plug 25 ignites air-fuel mixture, whereby the air-fuel mixture is combusted by flame propagation. Thereafter, autoignition of the unburned air-fuel mixture occurs to cause CI combustion.

(First Intermediate Load Region (Supercharge SICI Combustion))

When load on the engine 1 is further increased and the operation state of the engine 1 thus enters the first intermediate load region (B1), the supercharger 44 performs supercharging with fresh air and external EGR gas. An amount of fresh air and an amount of external EGR gas, which are to be introduced into the combustion chamber 17, are both increased according to load on the engine 1 being increased. An amount of the external EGR gas to be introduced into the combustion chamber 17 is, for example, 30% when represented as the EGR ratio. The EGR ratio is constant regardless of whether load on the engine 1 is high or low. Therefore, the G/F of air-fuel mixture is also constant regardless of whether load on the engine 1 is high or low. An amount of EGR gas to be introduced into the combustion chamber 17 is sequential between the second intermediate load region and the first intermediate load region.

The SI rate indicates a predetermined value that is less than 100%, and is made constant regardless of whether the load on the engine 1 is high or low. When the SI rate in the second intermediate load region, particularly, the SI rate for which load is higher than the predetermined load L1, and which is gradually increased according to load on the engine 1 being increased, is compared with the SI rate in the first intermediate load region, the SI rate in the first intermediate load region in which load on the engine 1 is higher, is greater than the SI rate in the second intermediate load region. The SI rate is sequential at a boundary between the first intermediate load region and the second intermediate load region.

Figure 16:
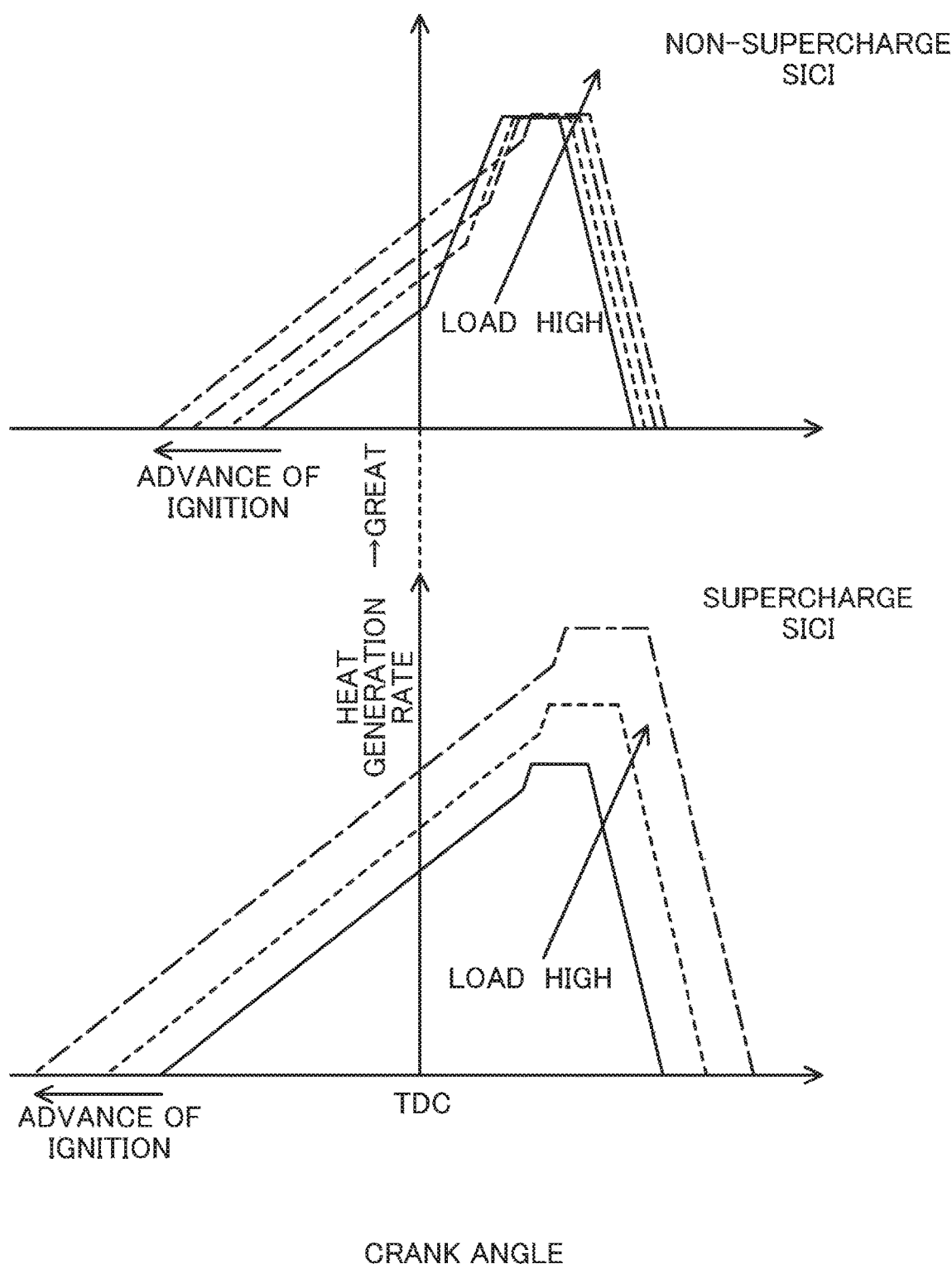
FIG. 16 illustrates, in the upper diagram, change of a combustion waveform with respect to increase of load on the engine in non-supercharge SICI combustion, and illustrates, in the lower diagram, change of a combustion waveform with respect to increase of load on the engine in supercharge SICI combustion.

As shown in the lower diagram of FIG. 16, also in supercharge SICI combustion, the ignition timing is gradually advanced according to an amount of fuel being increased. As described above, an amount of fresh air and an amount of EGR gas, which are to be introduced into the combustion chamber 17, are increased by supercharging, whereby heat capacity is high. Even when an amount of fuel is increased, an increase in temperature in the combustion chamber due to SI combustion can be inhibited. A waveform of the heat generation rate in supercharge SICI combustion is enlarged in similar shapes according to load being increased.

That is, an amount of heat generated by SI combustion is increased with little change of the slope of the heat generation rate in the SI combustion. At almost the same timing at or after the compression top dead center, autoignition of unburned air-fuel mixture occurs. An amount of heat generated by CI combustion is increased when load on the engine 1 becomes high. As a result, in the first intermediate load region, both an amount of heat generated by the SI combustion and an amount of heat generated by the CI combustion are increased, whereby the SI rate is constant regardless of whether load on the engine 1 is high or low. When a peak of heat generation in the CI combustion is enhanced, combustion noise is increased. However, in the first intermediate load region, since load on the engine 1 is relatively high, combustion noise can be allowed to a certain degree. The higher load is, the more greatly the center of gravity of combustion in supercharge SICI combustion is retarded.

In the first intermediate load region, an overlap period in which both the intake valve 21 and the exhaust valve 22 are opened is set around the exhaust top dead center. Burned gas in the combustion chamber 17 is scavenged by supercharging. Thus, since the temperature in the combustion chamber 17 becomes low, abnormal combustion can be inhibited from occurring when load on the engine 1 is relatively high. Furthermore, by the temperature in the combustion chamber 17 being lowered, timing of autoignition can be made appropriate in a region in which load on the engine 1 is relatively high, and the SI rate can be maintained as a predetermined SI rate. Furthermore, by scavenging burned gas, an amount of fresh air to be filled in the combustion chamber 17 can be increased.

In the first intermediate load region, the injector 6 injects fuel into the combustion chamber 17 in two parts as preceding injection and succeeding injection in the compression stroke. In the preceding injection, fuel is injected at timing that is not close to the ignition timing. In the succeeding injection, fuel is injected at timing close to the ignition timing. The ECU 10 changes the injection ratio between the preceding injection and the succeeding injection according to the load on the engine 1.

In the combustion chamber 17, almost homogeneous air-fuel mixture having an excess air ratio $\lambda$ of 1.0±0.2 and a G/F of 18.5 to 30 is formed. Since the air-fuel mixture is almost homogeneous, improvement of fuel economy by reduction of unburned fuel loss, and improvement of exhaust gas performance by avoiding generation of smoke, can be achieved. The excess air ratio $\lambda$ is preferably 1.0 to 1.2.

At predetermined timing before the compression top dead center, the spark plug 25 ignites air-fuel mixture, whereby the air-fuel mixture is combusted by flame propagation. Thereafter, autoignition of unburned air-fuel mixture occurs to cause CI combustion. Fuel injected in the succeeding injection is subjected mainly to SI combustion. Fuel injected in the preceding injection is subjected mainly to CI combustion. Since the preceding injection is performed in the compression stroke, abnormal combustion such as preignition can be prevented from being caused by fuel injected in the preceding injection. Furthermore, fuel injected in the succeeding injection can be stably combusted by flame propagation.

(High Load Region (High Load SI Combustion))

When load on the engine 1 is further increased and the operation state of the engine 1 enters the high load region (C), the engine 1 performs high load SI combustion. Therefore, the SI rate in the high load region is 100%.

The throttle valve 43 is fully opened. The supercharger 44 performs supercharging with fresh air and external EGR gas also in the high load region. The opening degree of the EGR valve 54 is adjusted, whereby an amount of external EGR gas to be introduced is gradually reduced according to load on the engine 1 being increased. Thus, fresh air to be introduced into the combustion chamber 17 is increased when load on the engine 1 becomes high. When an amount of fresh air is increased, an amount of fuel can be increased. Therefore, the maximum output of the engine 1 is advantageously enhanced. An amount of EGR gas to be introduced into the combustion chamber 17 is sequential between the first intermediate load region and the high load region.

Also in the high load region, similarly to the first intermediate load region, an overlap period in which both the intake valve 21 and the exhaust valve 22 are opened is set around the exhaust top dead center. Burned gas in the combustion chamber 17 is scavenged by supercharging. Thus, abnormal combustion is inhibited. Furthermore, an amount of fresh air to be filled in the combustion chamber 17 can be increased.

In the high load region, the injector 6 injects fuel into the combustion chamber 17 in the retard period as described above. Almost homogeneous air-fuel mixture having an excess air ratio $\lambda$ of 1.0±0.2 and a G/F of 18.5 to 30 is formed in the combustion chamber 17. At the highest load, the excess air ratio $\lambda$ is, for example, 0.8. Furthermore, the G/F of air-fuel mixture may be, for example, 17 at the highest load. At predetermined timing before the compression top dead center, the spark plug 25 ignites air-fuel mixture, whereby the air-fuel mixture is combusted by flame propagation. In the high load region, SI combustion of the air-fuel mixture occurs by high-pressure retard injection without causing autoignition.

(Adjustment of SI Rate)

Figure 17:
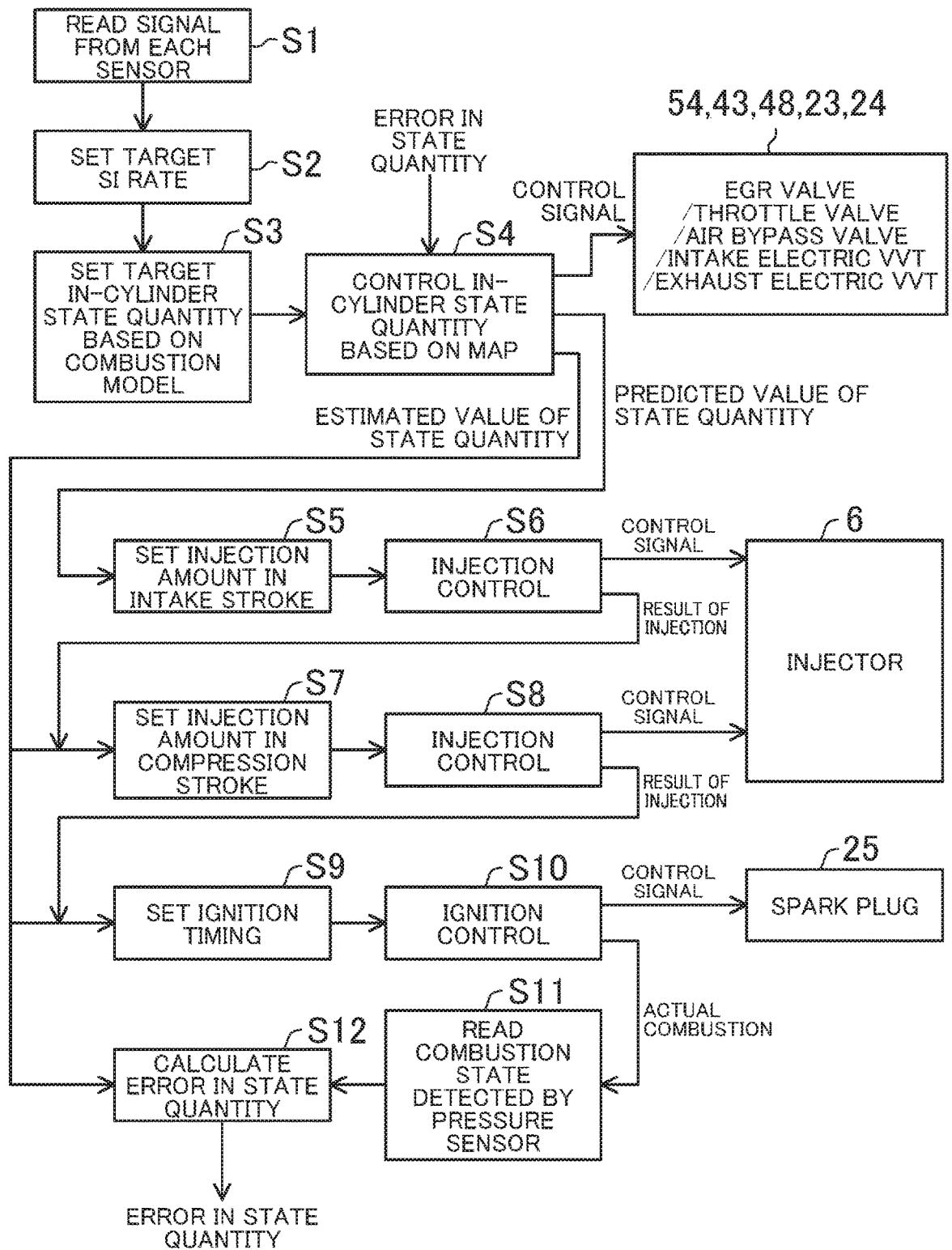
FIG. 17 a flow chart showing a procedure of control, of the engine, performed by an ECU.

FIG. 17 shows a flow of operation control, of the engine, performed by the ECU 10. The ECU 10 determines an operation state of the engine 1 based on the detection signals from the sensors SW1 to SW16, and adjusts a state quantity in the combustion chamber 17, adjusts an injection amount, adjusts injection timing, and adjusts ignition timing such that combustion in the combustion chamber 17 becomes combustion at an SI rate corresponding to the operation state. The ECU 10 also adjusts the SI rate when determining that the SI rate needs to be adjusted, based on detection signals from the sensors.

The ECU firstly reads detection signals from the sensors SW1 to SW16 in step S1. Subsequently, the ECU 10 determines an operation state of the engine 1 based on the detection signals, and sets a target SI rate in step S2. The target SI rate is as shown in FIG. 15.

In subsequent step S3, the ECU 10 sets a target in-cylinder state quantity for obtaining the target SI rate having been set, based on a preset combustion model. Specifically, a target temperature, a target pressure, and a target state quantity in the combustion chamber 17 are set. In step S4, the ECU 10 sets an opening degree of the EGR valve 54, an opening degree of the throttle valve 43, an opening degree of the air bypass valve 48, and phase angles of the intake electric VVT 23 and the exhaust electric VVT 24, which are necessary for obtaining the target in-cylinder state quantity. The ECU 10 presets control amounts for these devices, and sets the control amounts based on a map stored in the ECU 10. The ECU 10 outputs control signals to the EGR valve 54, the throttle valve 43, the air bypass valve 48, and the intake electric VVT 23 and the exhaust electric VVT 24, based on the set control amounts. Each device operates based on the control signal from the ECU 10, whereby the state quantity in the combustion chamber 17 becomes the target state quantity.

The ECU 10 further calculates a predicted value and an estimated value of the state quantity in the combustion chamber 17, based on the set control amount for each device. The predicted value of the state quantity is a value obtained by predicting a state quantity, in the combustion chamber 17, before closing of the intake valve 21, and is used for setting an amount of fuel injected in the intake stroke as described below. The estimated value of the state quantity is a value obtained by estimating a state quantity, in the combustion chamber 17, after closing of the intake valve 21, and is used for setting an amount of fuel injected in the compression stroke and setting ignition timing as described below. The estimated value of the state quantity is also used for calculating an error in state quantity based on comparison with an actual combustion state as described below.

The ECU 10 sets, in step S5, an amount of fuel to be injected in the intake stroke based on the predicted value of the state quantity. When fuel is not injected in the intake stroke, the amount of injected fuel is zero. In step S6, the ECU 10 controls injection by the injector 6. That is, a control signal is outputted to the injector 6 such that fuel is injected into the combustion chamber 17 at predetermined injection timing.

In step S7, the ECU 10 sets an amount of fuel to be injected in the compression stroke based on the estimated value of the state quantity and a result of injection of fuel in the intake stroke. When fuel is not injected in the compression stroke, the amount of injected fuel is zero. When divided injection is performed in the compression stroke, each of an amount of injection in the preceding injection and an amount of injection in the succeeding injection is set. In step S8, the ECU 10 outputs a control signal to the injector 6 such that fuel is injected into the combustion chamber 17 at injection timing based on the preset map.

In step S9, the ECU 10 sets ignition timing based on the estimated value of the state quantity and a result of injection of fuel in the compression stroke. In step S10, the ECU 10 outputs a control signal to the spark plug 25 such that air-fuel mixture in the combustion chamber 17 is ignited at the set ignition timing.

The spark plug 25 ignites the air-fuel mixture, to cause SI combustion or SICI combustion in the combustion chamber 17. In step S11, the ECU 10 reads change of pressure, in the combustion chamber 17, detected by the pressure sensor SW6, and determines, based thereon, a combustion state of the air-fuel mixture in the combustion chamber 17. Furthermore, in step S12, the ECU 10 compares a result of detection of the combustion state with the estimated value of the state quantity, which is estimated in step S4, and calculates an error between the estimated value of the state quantity and an actual state quantity. The calculated error is used for estimation in step S4 in cycles subsequent to this cycle. The ECU 10 adjusts opening degrees of the throttle valve 43, the EGR valve 54, and/or the air bypass valve 48, and phase angles of the intake electric VVT 23 and the exhaust electric VVT 24 so as to remove the error in the state quantity. Thus, amounts of fresh air and EGR gas to be introduced into the combustion chamber 17 are adjusted. Feedback of the error in the state quantity corresponds to adjustment of an SI rate performed by the ECU 10 when adjustment of the SI rate is determined to be necessary based on the error between the target SI rate and the actual SI rate.

Furthermore, in step S8, injection timing in the compression stroke is advanced so as to be earlier than injection timing based on the map, by the ECU 10, such that ignition timing can be advanced, when the ECU 10 makes prediction that the temperature in the combustion chamber 17 is lower than the target temperature based on the estimated value of the state quantity. Meanwhile, in step S8, the ECU 10 retards injection timing in the compression stroke from injection timing based on the map such that ignition timing can be retarded when the ECU 10 makes prediction that the temperature in the combustion chamber 17 is higher than the target temperature based on the estimated value of the state quantity.

Figure 18:
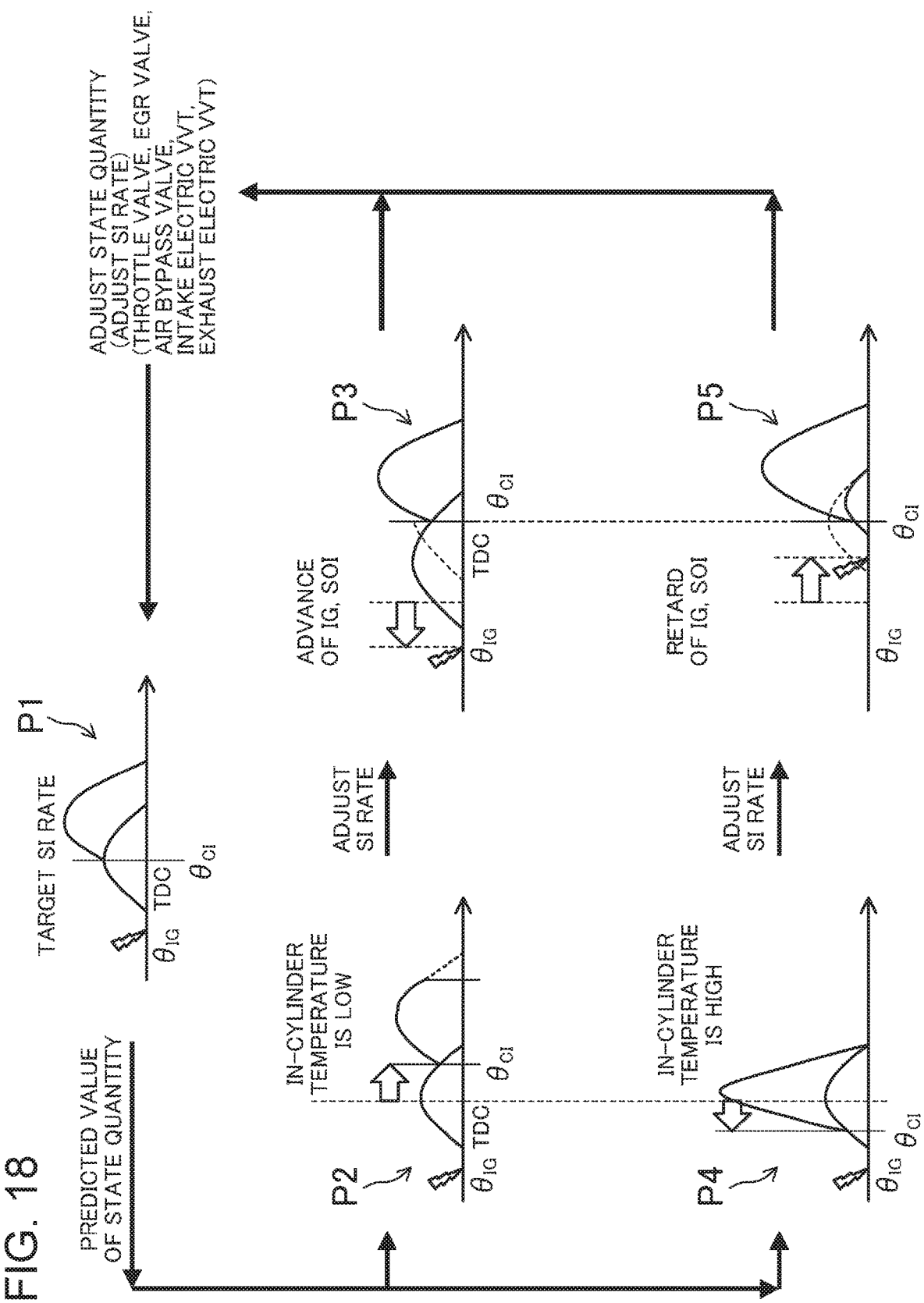
FIG. 18 conceptually illustrates control of adjustment of an SI rate.

That is, as indicated by P2 in FIG. 18, when the temperature in the combustion chamber 17 is low, after SI combustion by spark ignition starts, timing $\theta_{CI}$ at which autoignition of unburned air-fuel mixture occurs delays, and the SI rate is deviated from the target SI rate (see P1). In this case, unburned fuel is increased or exhaust gas performance is degraded.

Therefore, when the ECU 10 makes prediction that the temperature in the combustion chamber 17 is lower than the target temperature, the ECU 10 advances the injection timing and also advances the ignition timing $\theta_{IG}$ in step S10 shown in FIG. 17. As indicated by P3 in FIG. 18, the start of SI combustion becomes earlier, whereby sufficient heat generation by the SI combustion can be caused. Therefore, when the temperature in the combustion chamber 17 is low, the timing $\theta_{CI}$ of autoignition of unburned air-fuel mixture can be prevented from being delayed. As a result, the SI rate approaches the target SI rate. Increase of unburned fuel or degradation of exhaust gas performance are prevented.

Furthermore, as indicated by P4 in FIG. 18, when the temperature in the combustion chamber 17 is high, autoignition of unburned air-fuel mixture occurs immediately after the SI combustion by spark ignition starts, and the SI rate is deviated from the target SI rate (see P1). In this case, combustion noise is increased.

Therefore, when the ECU 10 makes prediction that the temperature in the combustion chamber 17 is higher than the target temperature, the ECU 10 retards the injection timing and also retards the ignition timing $\theta_{IG}$ in step S10 shown in FIG. 17. As indicated by P5 in FIG. 18, since start of the SI combustion is delayed, when the temperature in the combustion chamber 17 is high, the timing $\theta_{CI}$ of autoignition of unburned air-fuel mixture can be prevented from being earlier. As a result, the SI rate approaches the target SI rate. Increase of combustion noise is prevented.

These adjustments of the injection timing and the ignition timing correspond to adjustment of the SI rate performed by the ECU 10 when adjustment of the SI rate in the SICI combustion is determined to be necessary. By adjusting the injection timing, an appropriate air-fuel mixture can be formed in the combustion chamber 17 at the advanced or retarded ignition timing. The spark plug 25 can assuredly ignite the air-fuel mixture, and autoignition of unburned air-fuel mixture can be also performed at appropriate timing.

In FIG. 18, adjustment of the state quantity in the combustion chamber 17 by controlling the throttle valve 43, the EGR valve 54, the air bypass valve 48, the intake electric VVT 23, and the exhaust electric VVT 24 based on an actual combustion state is as described for step S12 and step S4 in FIG. 17.

The engine 1 adjusts the SI rate by means of the state quantity setting device that includes the throttle valve 43, the EGR valve 54, the air bypass valve 48, the intake electric VVT 23, and the exhaust electric VVT 24. By adjusting the state quantity in the combustion chamber 17, the SI rate can be roughly adjusted. In addition thereto, the engine 1 adjusts the fuel injection timing and the ignition timing, to adjust the SI rate. By adjusting the injection timing and the ignition timing, for example, correction of difference between the cylinders can be performed, and slight adjustment of the autoignition timing can be performed. By adjusting the SI rate at two stages, the engine 1 can accurately perform the target SICI combustion corresponding to the operation state.

The control of the engine 1 by the ECU 10 is not limited to control based on the combustion model described above.

The technique disclosed here is not limited to application to the engine 1 having the above-described configuration. Various configurations can be adopted as the configuration of the engine 1.

DESCRIPTION OF REFERENCE CHARACTERS

1 Engine
10 ECU (Controller)
11 Cylinder
1311, 1312 Inclined Surface (Roof)
17 Combustion Chamber
171 Squish Area
Intake Electric VVT (State Quantity Setting Device, Variable Valve Mechanism)
24 Exhaust Electric VVT (State Quantity Setting Device, Variable Valve Mechanism)
25 Spark Plug
3 Piston
31 Cavity
43 Throttle Valve (State Quantity Setting Device)
44 Supercharger
48 Air Bypass Valve (State Quantity Setting Device)
49 Supercharging System (State Quantity Setting Device)
54 EGR Valve (State Quantity Setting Device)
55 EGR System (State Quantity Setting Device)
6 Injector
61 Fuel Supply System
SW1 Air Flow Sensor
SW2 First Intake Air Temperature Sensor
SW3 First Pressure Sensor
SW4 Second Intake Air Temperature Sensor
SW5 Second Pressure Sensor
SW6 Pressure Sensor
SW7 Exhaust Air Temperature Sensor
SW8 Linear $O_2$ Sensor
SW9 Lambda $O_2$ Sensor
SW10 Water Temperature Sensor
SW11 Crank Angle Sensor
SW12 Accelerator Opening Degree Sensor
SW13 Intake Cam Angle Sensor
SW14 Exhaust Cam Angle Sensor
SW15 EGR Differential Pressure Sensor
SW16 Fuel Pressure Sensor

The invention claimed is:

1. A combustion control device for a compression autoignition engine, the combustion control device comprising:
an engine configured to cause autoignition of air-fuel mixture in a combustion chamber formed by a cylinder and a piston;
a state quantity setting device mounted to the engine, the state quantity setting device configured to set an inside of the combustion chamber to a desired state by adjusting introduction of fresh air and burned gas into the combustion chamber;
an injector mounted to a roof of the combustion chamber, the injector configured to inject fuel into the combustion chamber;
a spark plug disposed so as to face the inside of the combustion chamber, the spark plug configured to ignite air-fuel mixture in the combustion chamber;
a controller connected to the state quantity setting device, the injector, and the spark plug, the controller configured to operate the engine by outputting control signals to the state quantity setting device, the injector, and the spark plug; and
a sensor connected to the controller, the sensor configured to detect a parameter regarding an operation state of the engine and output a detection signal to the controller, wherein
the piston has a cavity that is recessed from an upper surface of the piston and that faces the injector,
the injector has a plurality of holes each having a hole axis inclined relative to a cylinder axis of the cylinder and injects the fuel toward the upper surface of the piston,
the spark plug receives a control signal from the controller and ignites the air-fuel mixture at predetermined ignition timing such that the ignited air-fuel mixture is combusted by flame propagation and then unburned air-fuel mixture in the combustion chamber is combusted by autoignition,
the controller outputs a control signal to the injector such that, in a compression stroke, the fuel is injected at specific timing at which a line obtained by extending the axis of each hole of the injector overlaps with a specific portion including an opening edge of the cavity in the upper surface of the piston,
when the operation state of the engine is in a predetermined operation region based on a detection signal from the sensor, the controller outputs control signals to the state quantity setting device, the injector, and the spark plug such that the ignited air-fuel mixture is combusted by flame propagation and then unburned air-fuel mixture in the combustion chamber is combusted by autoignition,
when the operation state of the engine is in a low load region in which a load is lower than that in the predetermined operation region, or in a high load region in which the load is higher than that in the predetermined operation region, based on a detection signal from the sensor, the controller outputs control signals to the state quantity setting device, the injector, and the spark plug such that air-fuel mixture in the combustion chamber is combusted by flame propagation without occurrence of combustion by autoignition,
the predetermined operation region includes an undivided injection region in which the load is lower than a predetermined load, and when the operation state of the engine is in the undivided injection region, the controller outputs a control signal to the injector such that the fuel is injected at once at the specific timing.

2. The combustion control device for the compression autoignition engine of claim 1, wherein
the injector is disposed at a center portion of the combustion chamber such that a central axis of the injector is parallel to the cylinder axis of the cylinder, and injects the fuel from the center portion of the combustion chamber toward a radially outer side, and
the cavity is located on an extension of the central axis of the injector.

3. The combustion control device for the compression autoignition engine of claim 1, wherein
the state quantity setting device has a supercharging system mounted to the engine and configured to perform supercharging with gas to be introduced into the combustion chamber,
the predetermined operation region is divided into a supercharge region and a non-supercharge region in which the load is lower than that in the supercharge region,
the supercharging system receives a control signal from the controller, performs supercharging when the operation state of the engine is in the supercharge region, and does not perform supercharging when the operation state of the engine is in the non-supercharge region, and
the undivided injection region is included in the non-supercharge region.

4. The combustion control device for the compression autoignition engine of claim 3, wherein: when the operation state of the engine is in the predetermined operation region, the controller sets an SI rate representing an index associated with a ratio of an amount of heat generated when air-fuel mixture is combusted by the flame propagation, relative to a total amount of heat generated when air-fuel mixture in the combustion chamber is combusted, such that the SI rate is less than 100%; and when the operation state of the engine is in the supercharge region, the controller sets the SI rate such that the SI rate is higher than that when the operation state of the engine is in the non-supercharge region.

5. The combustion control device for the compression autoignition engine of claim 1, wherein, when the operation state of the engine is in the low load region, the controller outputs a control signal to the injector such that the fuel is injected in the intake stroke.

6. The combustion control device for the compression autoignition engine of claim 1, wherein the specific timing is $70\pm5°$ C.A before a compression top dead center.

7. The combustion control device for the compression autoignition engine of claim 1, further comprising a fuel supply system connected to the injector and configured to supply the fuel to the injector, wherein
when the fuel is injected at the specific timing, the controller outputs a control signal to the fuel supply system such that a pressure of the fuel is a predetermined pressure or greater.

8. The combustion control device for the compression autoignition engine of claim 1, wherein the controller sets a state inside the combustion chamber such that a G/F representing an index associated with a mass ratio between total gas and the fuel in the combustion chamber is in a range from 18.5 to 30 and an excess air ratio X is $1.0\pm0.2$, by outputting control signals to the state quantity setting device and the injector.

* * * * *